United States Patent
Zhang et al.

(10) Patent No.: US 11,191,070 B2
(45) Date of Patent: Nov. 30, 2021

(54) METHOD AND APPARATUS FOR DETERMINING SEARCH SPACE

(71) Applicant: HUAWEI TECHNOLOGIES CO., LTD., Guangdong (CN)

(72) Inventors: Xu Zhang, Beijing (CN); Lixia Xue, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/813,501

(22) Filed: Mar. 9, 2020

(65) Prior Publication Data
US 2020/0213983 A1  Jul. 2, 2020

Related U.S. Application Data

(63) Continuation of application No. PCT/CN2018/104790, filed on Sep. 10, 2018.

(30) Foreign Application Priority Data

Sep. 10, 2017  (CN) .......................... 201710811890.8

(51) Int. Cl.
*H04W 72/04*  (2009.01)
(52) U.S. Cl.
CPC ................. *H04W 72/042* (2013.01)
(58) Field of Classification Search
CPC .................................................. H04W 72/042
See application file for complete search history.

(56) References Cited

U.S. PATENT DOCUMENTS

2021/0136770 A1\* 5/2021 Nakashima ........... H04W 72/04

FOREIGN PATENT DOCUMENTS

| CN | 101771462 A | 7/2010 |
|----|-------------|--------|
| CN | 101897227 A | 11/2010 |
| CN | 102255688 A | 11/2011 |
| CN | 102355340 A | 2/2012 |
| CN | 103190113 A | 7/2013 |
| CN | 103326841 A | 9/2013 |

(Continued)

OTHER PUBLICATIONS

Huawei et al.,"Search space design",3GPP TSG RAN WG1 NR Ad Hoc Meeting R1-1709952,Qingdao, China, 27 Jun. 30, 2017,total 6 pages.

(Continued)

*Primary Examiner* — Ronald B Abelson
(74) *Attorney, Agent, or Firm* — Womble Bond Dickinson (US) LLP

(57) ABSTRACT

In a method and apparatus for determining a search space, a control resource set of a terminal device is corresponding to at least two aggregation levels. The at least two aggregation levels include a maximum aggregation level and a first aggregation level, the first aggregation level is less than the maximum aggregation level, and the maximum aggregation level is the highest aggregation level of the at least two aggregation levels. Based on the method and the apparatus, a first search space corresponding to the first aggregation level is determined based on a quantity of control channel elements (CCEs) included in the control resource set of the terminal device and the maximum aggregation level.

20 Claims, 28 Drawing Sheets

(56) References Cited

FOREIGN PATENT DOCUMENTS

| | | | |
|---|---|---|---|
| CN | 103391563 | A | 11/2013 |
| CN | 103716144 | A | 4/2014 |
| CN | 105830384 | A | 8/2016 |
| CN | 106233794 | A | 12/2016 |
| CN | 106559173 | A | 4/2017 |
| EP | 2437422 | A1 | 4/2012 |

OTHER PUBLICATIONS

NTT DOCOMO, INC.,"Search space design for NR-PDCCH",3GPP TSG RAN WG1 Meeting #90, R1-1713931, Prague, Czechia, Aug. 21-25, 2017, total 4 pages.

Samsung,"Search Space Design",3GPP TSG RAN WG1 Meeting #90, R1-1713613, Prague, Czechia, Aug. 21-25, 2017, total 6 pages.

* cited by examiner

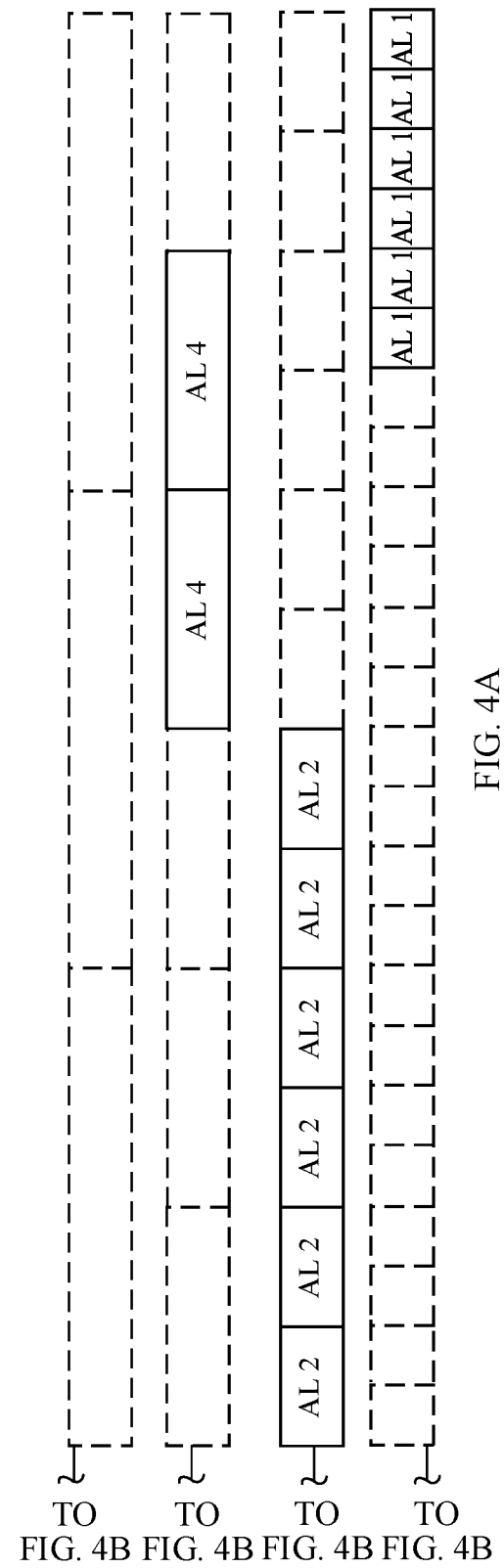

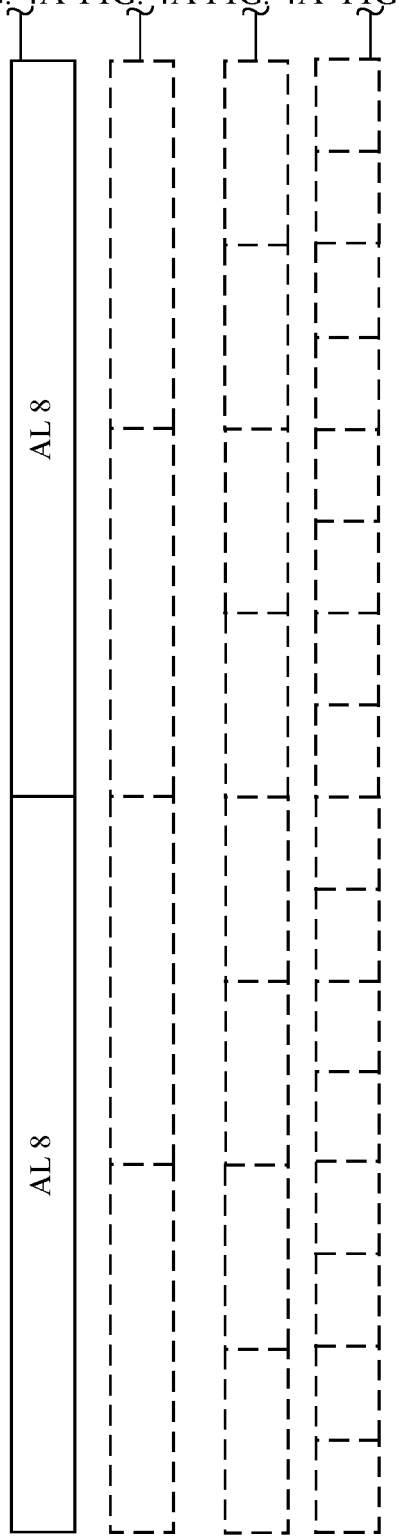

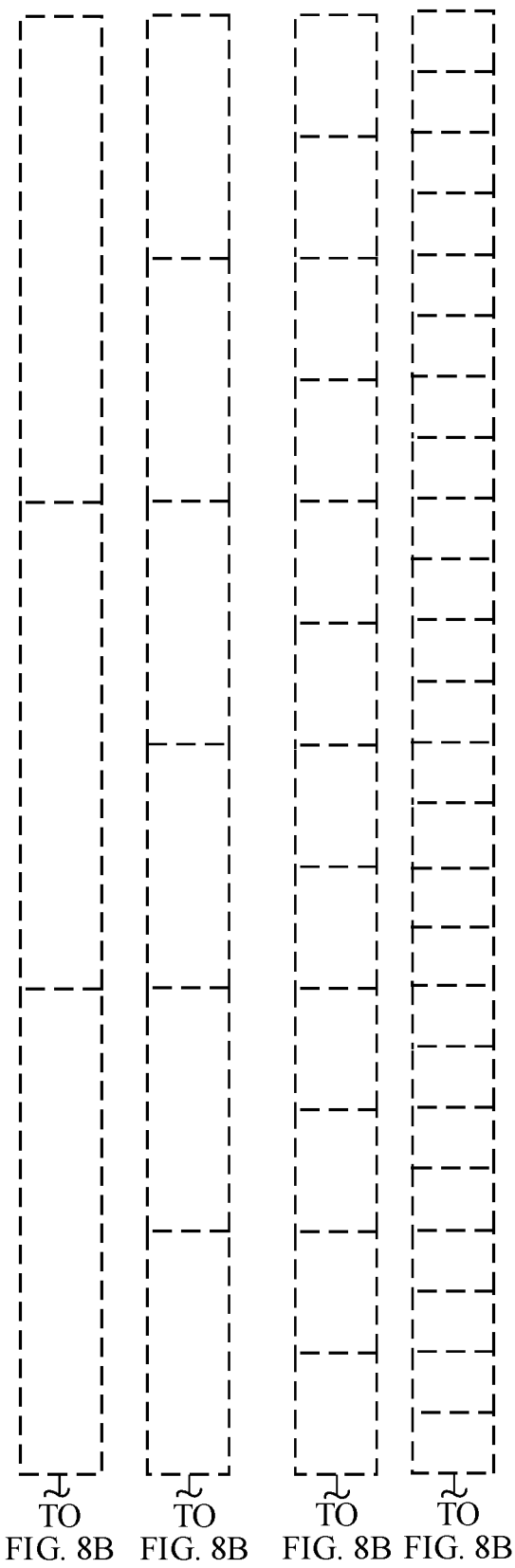

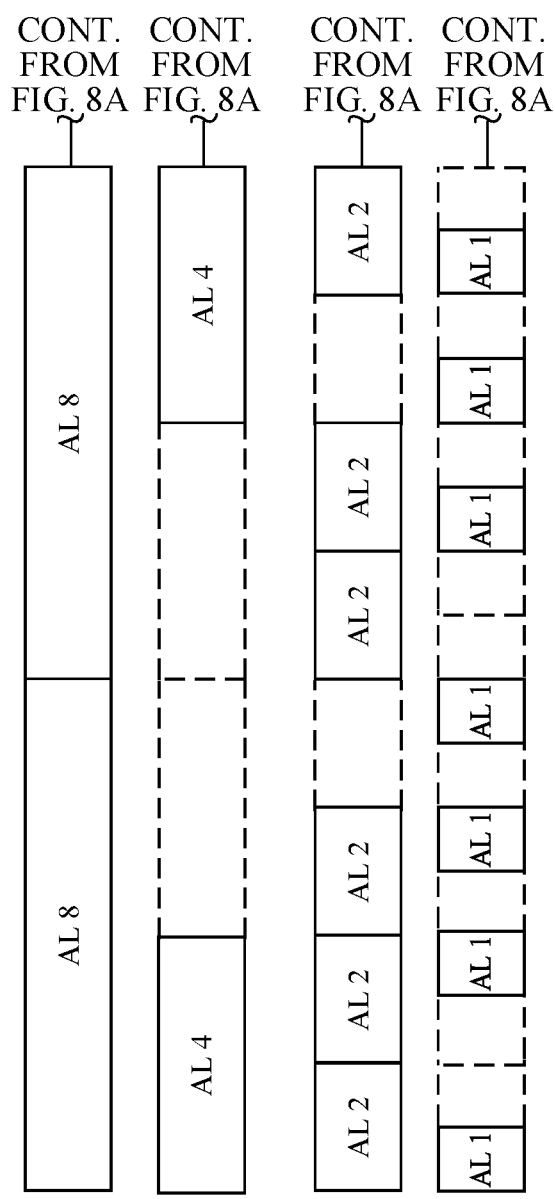

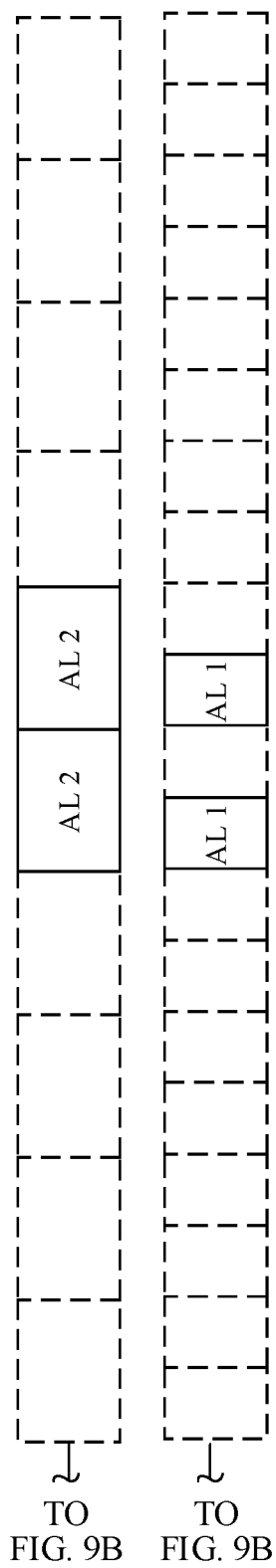

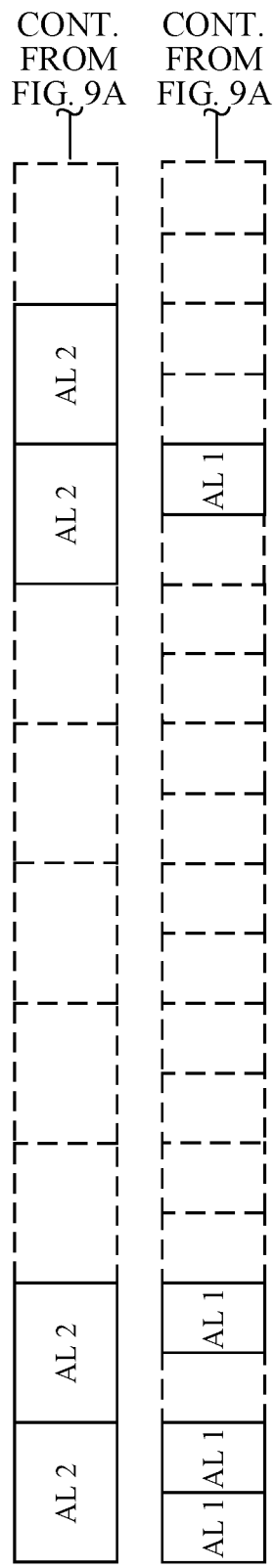

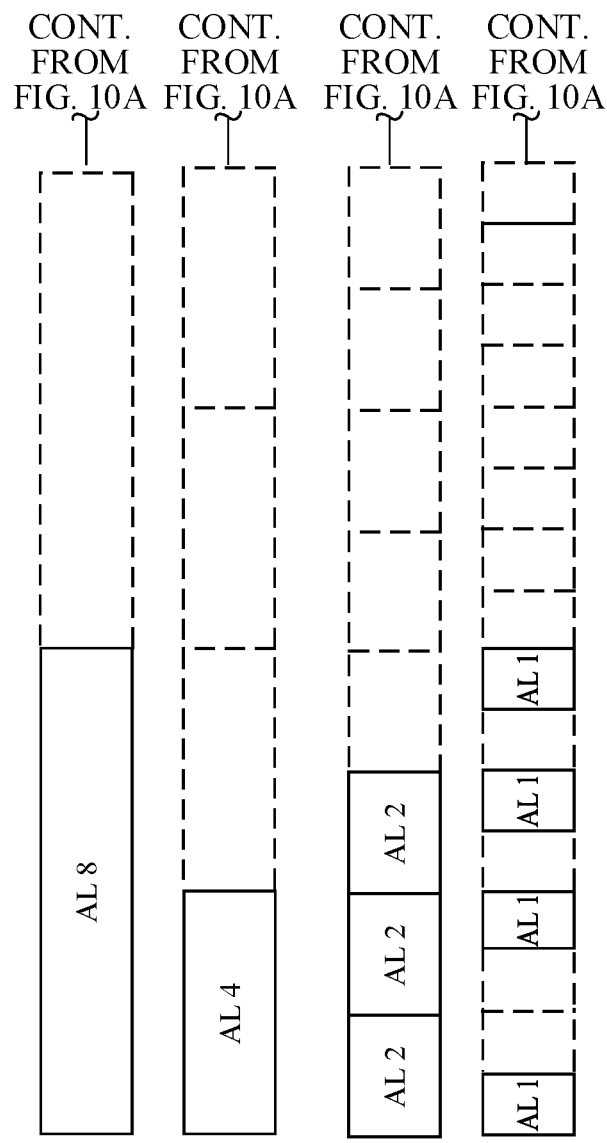

TO

TO

CONT.
FROM

TO

CONT. FROM FIG. 14B

TO

METHOD AND APPARATUS FOR DETERMINING SEARCH SPACE

CROSS-REFERENCE TO RELATED APPLICATIONS

This application is a continuation of International Application No. PCT/CN2018/104790, filed on Sep. 10, 2018, which claims priority to Chinese Patent Application No. 201710811890.8, filed on Sep. 10, 2017, The disclosures of the aforementioned applications are hereby incorporated by reference in their entireties.

TECHNICAL FIELD

Embodiments of the present disclosure relate to the communication field, and more specifically, to a method and apparatus for determining a search space.

BACKGROUND

In a long term evolution (LTE) system, a base station sends, to user equipment (UE), a physical downlink control channel (PDCCH) or an enhanced physical downlink control channel (EPDCCH) that carries various types of downlink control information (DCI). The UE should detect a PDCCH in a search space, to obtain the DCI carried in the PDCCH. One PDCCH is formed by aggregating L continuous control channel elements (CCE). L is referred to as an aggregation level of the PDCCH. The aggregation level may be a positive integer greater than or equal to 1.

The search space is a set of PDCCHs that are to be detected by the UE (also referred to as PDCCH candidates (PDCCH candidate)) or a set of EPDCCHs that are to be detected by the UE (also referred to as EPDCCH candidates (EPDCCH candidate)). One search space includes a plurality of PDCCH candidates or a plurality of EPDCCH candidates. The PDCCH candidate and the EPDCCH candidate are collectively referred to as a control channel candidate hereinafter. Control channel candidates included in one search space have a same aggregation level. There are two types of search spaces: a common search space (CSS) and a UE specific search space (UESS). The CSS is a search space that should be listened to by a plurality of UEs in a cell, and the USS is a search space that should be listened to by particular UE.

For the PDCCH of the LTE system, the UE determines, based on formula (1), a CCE occupied by each PDCCH candidate in a search space. formula (1) is as follows:

$$L \cdot \{(Y_k + m) \bmod \lfloor N_{CCE,k}/L \rfloor\} + i \qquad (1).$$

Herein, i=0,L, L−1, m=0,L, $M^{(L)}$−1 k represents a subframe number, $N_{CCE,k}$ represents a total quantity of CCEs in a control region in a subframe k, m may represent a number (index) of a PDCCH candidate, L is an aggregation level corresponding to the search space, $M^{(L)}$ is a quantity of PDCCH candidates in the search space corresponding to the aggregation level of L. For common search spaces corresponding to aggregation levels of 4 and 8, $Y_k$ is 0. For a UE specific search space, $Y_k$ is a coefficient related to a radio network temporary identifier (RNTI) of the UE, and $Y_k$ is expressed as follows:

$$Y_k = (A \cdot Y_{k-1}) \bmod D \qquad (2).$$

Herein, $Y_{-1} = n_{RNTI} \neq 0$, A=39827, D=65537, and $k = \lfloor n_s/2 \rfloor$, where $n_s$ is a number of a slot in a radio frame, and $n_{RNTI}$ represents different types of RNTIs.

For the EPDCCH of the LTE system, the UE determines, based on formula (3), a CCE occupied by each control channel candidate in a search space. Formula (3) is as follows:

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor\right\} + i. \qquad (3)$$

Herein, p=0 or p=1, $Y_{p,k}$ is a coefficient related to an RNTI of UE and an EPDCCH-physical resource block-set p, a determining manner of $Y_{p,k}$ is basically the same as that of $Y_{p,k}$ in formula (2), and a difference is that when p=0, $A_0$=39827; or when p=1, $A_1$=39829. m represents an (m+1)$^{th}$ EPDCCH candidate in a search space corresponding to an aggregation level of L in the EPDCCH physical resource block set p, and m=0,1,K $M_p^{(L)}$−1. $M_p^{(L)}$ is a quantity of to-be-detected EPDCCH candidates with the aggregation level of L in the EPDCCH physical resource block set P, b is equal to 0 or a configured value, $N_{ECCE,p,k}$ represents a quantity of CCEs in the EPDCCH physical resource block set P of a subframe k, and other parameters are the same as those in formula (1).

SUMMARY

Embodiments of the present disclosure provide a method and apparatus for determining a search space.

In one embodiment, a method for determining a search space is provided. The method includes: determining a quantity $N_{CCE}$ of control channel elements CCEs included in a control resource set of a terminal device, where $N_{CCE}$ is a positive integer, the control resource set is corresponding to at least two aggregation levels, the at least two aggregation levels include a maximum aggregation level and a first aggregation level, the first aggregation level is less than the maximum aggregation level, and the maximum aggregation level is the highest aggregation level in the at least two aggregation levels; and further determining, based on the quantity $N_{CCE}$ of CCEs and the maximum aggregation level, a first search space corresponding to the first aggregation level; or determining, based on the quantity $N_{CCE}$ of CCEs and a quantity of CCEs included in a search space corresponding to the maximum aggregation level, a first search space corresponding to the first aggregation level.

In one embodiment, a wireless apparatus is provided, including a processor and a memory coupled to the processor.

The processor is configured to determine a quantity $N_{CCE}$ of control channel elements CCEs included in a control resource set of a terminal device, where $N_{CCE}$ is a positive integer, the control resource set is corresponding to at least two aggregation levels, the at least two aggregation levels include a maximum aggregation level and a first aggregation level, the first aggregation level is less than the maximum aggregation level, and the maximum aggregation level is the highest aggregation level in the at least two aggregation levels.

The processor is further configured to determine, based on the quantity $N_{CCE}$ of CCEs and the maximum aggregation level, a first search space corresponding to the first aggregation level.

Alternatively, the processor is further configured to determine, based on the quantity $N_{CCE}$ of CCEs and a quantity of CCEs included in a search space corresponding to the maximum aggregation level, a first search space corresponding to the first aggregation level.

In this embodiment, the first search space corresponding to the first aggregation level is determined based on the maximum aggregation level. Alternatively, the first search space corresponding to the first aggregation level is determined based on the quantity of CCEs included in the search space corresponding to the maximum aggregation level, and the first aggregation level is less than the maximum aggregation level. Therefore, the search space corresponding to the low aggregation level can be completely nested in the search space corresponding to the maximum aggregation level. In other words, the CCEs of the first search space are a subset of CCEs of the second search space. In this way, because a large quantity of CCEs included in different search spaces overlap with each other, during blind detection performed a plurality of times, multiplexing of channel estimation and/or demodulation of a received signal can be implemented, thereby reducing a quantity of times for repeatedly performing channel estimation and reducing demodulation complexity of a signal.

In one embodiment, a method for determining a search space is provided. The method includes: determining a quantity $N_{CCE}$ of control channel elements CCEs included in a control resource set of a terminal device, where $N_{CCE}$ is a positive integer, the control resource set is corresponding to at least two aggregation levels, the at least two aggregation levels include a maximum aggregation level and a first aggregation level, the first aggregation level is less than the maximum aggregation level, and the maximum aggregation level is the highest aggregation level in the at least two aggregation levels; further determining a second search space based on a parameter $\alpha$, where the second search space is a search space corresponding to the maximum aggregation level, $\alpha$ meets a relation that a maximum common divisor of $\alpha$ and $$\left\lfloor \frac{N_{CCE}}{L_{MAX}} \right\rfloor$$

is 1, and $L_{MAX}$ is the maximum aggregation level; and optionally, determining, based on the quantity $N_{CCE}$ of CCEs and the maximum aggregation level, a first search space corresponding to the first aggregation level; or determining, based on the quantity $N_{CCE}$ of CCEs and a quantity of CCEs included in the search space corresponding to the maximum aggregation level, a first search space corresponding to the first aggregation level.

In one embodiment, a wireless apparatus is provided, including a processor and a memory coupled to the processor.

The processor is configured to determine a quantity $N_{CCE}$ of control channel elements CCEs included in a control resource set of a terminal device, where $N_{CCE}$ is a positive integer, the control resource set is corresponding to at least two aggregation levels, the at least two aggregation levels include a maximum aggregation level and a first aggregation level, the first aggregation level is less than the maximum aggregation level, and the maximum aggregation level is the highest aggregation level in the at least two aggregation levels.

The processor is further configured to determine a second search space based on a parameter $\alpha$, where the second search space is a search space corresponding to the maximum aggregation level, $\alpha$ meets a relation that a maximum common divisor of $\alpha$ and $$\left\lfloor \frac{N_{CCE}}{L_{MAX}} \right\rfloor$$

is 1, and $L_{MAX}$ is the maximum aggregation level.

Optionally, the processor is further configured to determine, based on the quantity $N_{CCE}$ of CCEs and the maximum aggregation level, a first search space corresponding to the first aggregation level; or the processor is further configured to determine, based on the quantity $N_{CCE}$ of CCEs and a quantity of CCEs included in the search space corresponding to the maximum aggregation level, a first search space corresponding to the first aggregation level.

In one embodiment, a communication apparatus is provided. The communication apparatus is configured to perform the foregoing method. These functions may be implemented by hardware, or may be implemented by executing corresponding software by hardware. The hardware or the software includes one or more units corresponding to the functions.

In one embodiment, a computer storage medium including an instruction is provided. When the instruction runs on a computer, the computer performs the foregoing methods.

In one embodiment, a computer program product including an instruction is provided. When the computer program product runs on a computer, the computer performs the methods in the foregoing embodiments, examples, and/or implementations.

BRIEF DESCRIPTION OF DRAWINGS

FIG. 4A and FIG. 4B are schematic distribution diagrams of PDCCH candidates included in search spaces corresponding to different aggregation levels.

FIG. 8A and FIG. 8B are possible schematic distribution diagrams of control channel candidates of first search spaces corresponding to aggregation levels of 4, 2 and 1 and a second search space corresponding to an aggregation level of 8 according to an embodiment of the present disclosure.

FIG. 9A and FIG. 9B are possible schematic distribution diagrams of control channel candidates of a first search space corresponding to an aggregation level of 1 and a second search space corresponding to an aggregation level of 2 according to an embodiment of the present disclosure.

FIG. 10A and FIG. 10B are other possible schematic distribution diagrams of control channel candidates of first search spaces corresponding to aggregation levels of 4, 2 and 1 and a second search space corresponding to an aggregation level of 8 according to an embodiment of the present disclosure.

DESCRIPTION OF EMBODIMENTS

The following describes the technical solutions in the embodiments of the present disclosure with reference to the accompanying drawings in the embodiments of the present disclosure. In should be noted that the technical solutions and features in the embodiments of the present disclosure may be mutually combined in the case of no conflict.

In the embodiments of the present disclosure, "a/an" means an individual, but this does not indicate that "a/an" can only be an individual and cannot be applied to another individual. For example, in the embodiments of the present disclosure, "a terminal device" is described for a specific terminal device, but this does not mean that "a terminal device" can be applied only to a particular terminal device. The terms "system" and "network" may be used interchangeably in this disclosure.

In this disclosure, use of "an embodiment" (or "an implementation") or "embodiments" (or "implementations") means that a particular feature, structure, characteristic, and the like that are described in combination with an embodiment are included in at least one embodiment. Therefore, "in an embodiment" or "in the embodiments" that appears throughout this specification does not represent a same embodiment.

Further, in the embodiments of the present disclosure, the terms "and/or" and "at least one" used in cases of "A and/or B" and "at least one of A and B" include any one of three solutions: a solution in which A is included but B is excluded, a solution in which B is included but A is excluded, and a solution in which both options A and B are included. For another example, such phrases in cases of "A, B, and/or C" and "at least one of A, B, and/or C" include any one of six solutions: a solution in which A is included but B and C are excluded, a solution in which B is included but A and C are excluded, a solution in which C is included but A and B are excluded, a solution in which A and B are included but C is excluded, a solution in which B and C are included but A is excluded, a solution in which A and C are included but B is excluded, and a solution in which all the three options A, B, and C are included. As easily understood by a person of ordinary skill in the art and a related art, all other similar descriptions can be understood in the foregoing manner in the embodiments of the present disclosure.

Figure 1:
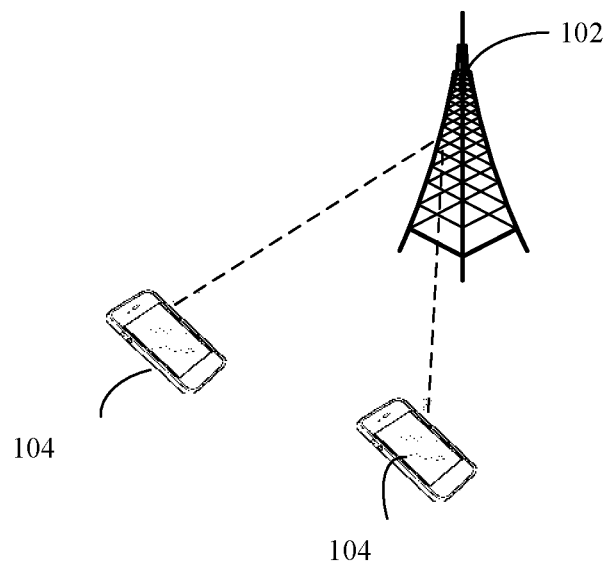
FIG. 1 is a schematic diagram of a wireless communication system applied to an embodiment of the present disclosure.

FIG. 1 is a schematic diagram of communication of a wireless device and a wireless communication system. The wireless communication system may be systems using various radio access technologies (RAT), for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, and another system. For example, the wireless communication system may be a long term evolution (LTE) system, a CDMA system, a wideband code division multiple access (WCDMA) system, a global system for mobile communications (GSM), a wireless local area network (WLAN) system, a new radio (NR) system, various evolved or convergent systems, and a system oriented to a future communication technology. The system architecture and the service scenario described in the embodiments of the present disclosure are intended to describe the technical solutions in the embodiments of the present disclosure more clearly, and do not constitute a limitation on the technical solutions provided in the embodiments of the present disclosure. A person of ordinary skill in the art may learn that, with the evolution of the network architecture and the emergence of new service scenarios, the technical solutions provided in the embodiments of the present disclosure are also applicable to similar technical problems.

For brevity, FIG. 1 shows communication between one network device (for example, an access network device) 102 and two wireless devices (for example, terminal devices) 104. Generally, a wireless communication system may include any quantity of network devices and terminal devices. The wireless communication system may further include one or more core network devices, a device configured to carry a virtualized network function, or the like. The access network device 102 may provide a service for the wireless devices by using one or more carriers. In this disclosure, the access network device and the terminal device are collectively referred to as a wireless apparatus.

In this disclosure, the access network device 102 is an apparatus that is deployed in a radio access network to provide a wireless communication function for the terminal device. The access network device may include a macro base station (BS), a micro base station (also referred to as a small cell), a relay node, an access point, or the like in various forms. In systems that use different radio access technologies, names of devices with a radio access function may be different. For example, in an LTE system, the device is referred to as an evolved NodeB (eNB or eNodeB), and in a 3rd generation (3G) system, the device is referred to as a NodeB, and or the like. For ease of description, in this disclosure, the device with a radio access function is referred to as an access network device, and is also referred to as a base station sometimes.

The wireless device in the embodiments of the present disclosure may include various handheld devices, vehicle-mounted devices, wearable devices, or computing devices that have a wireless communication function, or other processing devices connected to a wireless modem. The wireless device may be referred to as a terminal device, or may be referred to as a mobile station (MS for short), a terminal, user equipment (UE), or the like. The wireless device may include a subscriber unit, a cellular phone, a smartphone, a wireless data card, a personal digital assistant (PDA) computer, a tablet computer, a modem or a modem processor, a handheld (handheld) device, a laptop computer, a netbook, a cordless phone or a wireless local loop (WLL) station, a Bluetooth device, a machine type communication (MTC) terminal, and the like. For ease of description, these devices are simply referred to as a terminal device or UE in this disclosure.

The wireless device may support one or more wireless technologies for wireless communication, such as 5G, LTE, WCDMA, CDMA, 1×, time division-synchronous code division multiple access (TD-SCDMA), GSM, and 802.11. The wireless device may also support a carrier aggregation technology.

A plurality of wireless devices may perform a same service or different services, for example, a mobile broadband service, an enhanced mobile broadband (eMBB) service, or a terminal-related ultra-reliable and low-latency communications (URLLC) service.

Figure 2:
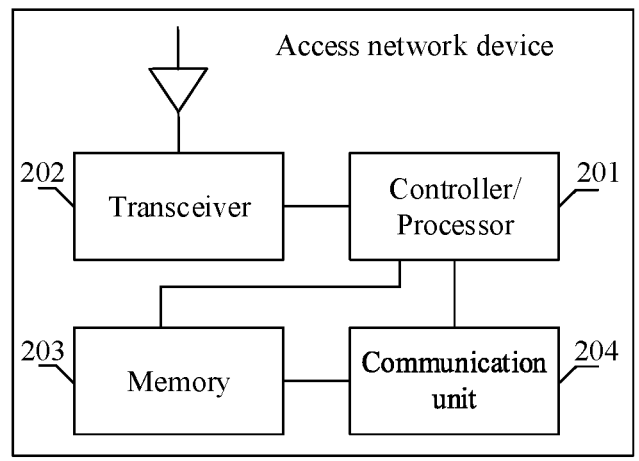
FIG. 2 is a possible schematic structural diagram of an access network device in the foregoing wireless communication system.

Further, a possible schematic structural diagram of the access network device 102 may be shown in FIG. 2. The access network device 102 can perform a method provided in the embodiments of the present disclosure. The access network device 102 may include a controller or a processor 201 (the processor 201 is used as an example below for description) and a transceiver 202. The controller/processor 201 is also referred to as a modem processor sometimes. The modem processor 201 may include a baseband processor (BBP) (not shown). The baseband processor processes a received and digitized signal, to extract information or a data bit conveyed in the signal. In this way, as required or as expected, the BBP is usually implemented in one or more digital signal processors (DSP) in the modem processor 201, or is implemented as separate integrated circuits (IC).

The transceiver 202 may be configured to: support information receiving and sending between the access network device 102 and the terminal devices, and support radio communication between the terminal devices. The processor 201 may be further configured to perform various functions of communication between the terminal device and another network device. In uplink, an uplink signal from the terminal device is received by using an antenna, and demodulated by the transceiver 202, and the demodulated uplink signal is further processed by the processor 201, to reconstruct service data and/or signaling information that are/is sent by the terminal device. In downlink, service data and/or a signaling message are/is processed by the terminal device and modulated by the transceiver 202, to generate a downlink signal, and the downlink signal is transmitted to the UE by using the antenna. The access network device 102 may further include a memory 203, and the memory 203 may be configured to store program code and/or data of the access network device 102. The transceiver 202 may include an independent receiver circuit and an independent transmitter circuit, or may include one circuit for implementing sending and receiving functions. The access network device 102 may further include a communication unit 204, and the communication unit 204 is configured to support communication between the access network device 102 and another network entity. For example, the communication unit 204 is configured to support communication between the access network device 102, a network device in a core network, and the like.

Optionally, the access network device may further include a bus. The transceiver 202, the memory 203, and the communication unit 204 may be connected to the processor 201 by using the bus. For example, the bus may be a peripheral component interconnect (PCI) bus, an extended industry standard architecture (EISA) bus, or the like. The bus may include an address bus, a data bus, a control bus, and the like.

Figure 3:
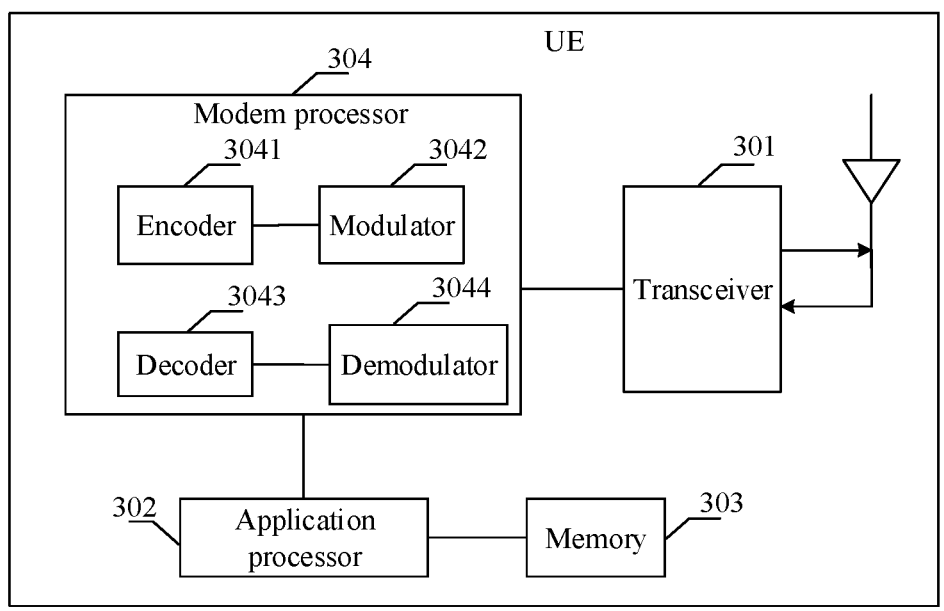
FIG. 3 is a possible schematic structural diagram of a terminal device in the foregoing wireless communication system.

FIG. 3 is a possible schematic structural diagram of a terminal device in the foregoing wireless communication system. The terminal device can perform the method provided in the embodiments of the present disclosure. The terminal device may be either of the two terminal devices 104. The terminal device includes a transceiver 301, an application processor 302, a memory 303, and a modem processor 304.

The transceiver 301 may adjust (for example, perform analog conversion, filtering, amplification, and up-conversion on) the output samples, and generate an uplink signal. The uplink signal is transmitted to the base station in the foregoing embodiment by using an antenna. In downlink, the antenna receives a downlink signal transmitted by the access network device. The transceiver 301 may adjust (for example, perform filtering, amplification, down-conversion, and digitization on) the signal received through the antenna, and provide an input sample.

The modem processor 304 is also referred to as a controller or a processor sometimes, and may include a baseband processor (BBP) (not shown). The baseband processor processes a received and digitized signal, to extract information or a data bit conveyed in the signal. As required or as expected, the BBP is usually implemented in one or more digital signal processors in the modem processor 304, or is implemented as separate integrated circuits (IC).

In a design, the modem processor 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message that are/is to be sent in uplink, and process (for example, format, encode, or interleave) the service data and the signaling message. The modulator 3042 is configured to modulate an output signal of the encoder 3041. For example, the modulator may perform processing such as symbol mapping and/or modulation on the output signal (data and/or signaling) of the encoder, and provide an output sample. The demodulator 3044 is configured to perform demodulation processing on an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the composite modem processor 304. These units perform processing based on a radio access technology used in a radio access network.

The modem processor 304 receives, from the application processor 302, digitized data that may represent voice, data, or control information, and processes the digitized data for transmission. The modem processor may support one or more of a plurality of wireless communication protocols in a plurality of communication systems, such as an LTE system, a new radio system, a universal mobile telecommunications system (UMTS), and a high speed packet access (HSPA) system. Optionally, the modem processor 304 may further include one or more memories.

Optionally, the modem processor 304 and the application processor 302 may be integrated into one processor chip.

The memory 303 is configured to store program code (also referred to as a program, an instruction, software, or the like sometimes) and/or data that are/is used to support communication of the terminal device.

It should be noted that the memory 203 or the memory 303 may include one or more storage units. For example, the storage unit may be a storage unit that is configured to store program code and that is inside the processor 201, the modem processor 304, or the application processor 302, or may be an external storage unit independent of the processor 201, the modem processor 304, or the application processor 302, or may be a component that includes a storage unit inside the processor 201, the modem processor 304, or the application processor 302 and an external storage unit independent of the processor 201, the modem processor 304, or the application processor 302.

The processor 201 and the modem processor 304 may be processors of a same type, or may be processors of different types. For example, the processor 201 and the modem processor 304 may be implemented in a central processing unit (CPU), a general purpose processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the modem processor 304 may implement or execute various example logic blocks, modules, and circuits described with reference to the content disclosed in the embodiments of the present disclosure. Alternatively, the processor may be a combination of components implementing a computing function, for example, a combination including one or more microprocessors, a combination of a DSP and a microprocessor, or a system-on-a-chip (SOC).

A person skilled in the art can understand that various explanatory logical blocks, modules, circuits, and algorithms described with reference to the various aspects disclosed in this disclosure may be implemented as electronic hardware, an instruction that is stored in a memory or another computer readable medium and that is executed by a processor or another processing device, or a combination thereof. For example, the device described in this specification may be used in any circuit, hardware component, IC, or IC chip. The memory disclosed in this disclosure may be any type of memory in any size, and may be configured to store any type of required information. To clearly explain such interchangeability, various explanatory components, blocks, modules, circuits, actions, operations, processes, and functions have been generally described above based on functionality. How to implement such functionality depends on specific applications, design selection, and/or design constraints imposed on an entire system. A person skilled in the art may use different manners to implement the described functionality for each particular application, but it should not be considered that such implementation goes beyond the scope of the present disclosure.

In an embodiment of the present disclosure, one control channel candidate is formed by aggregating L start control channel elements (CCE), and L represents an aggregation level of the control channel candidate. Numbers of the L CCEs included in the control channel candidate are continuous, and a start CCE represents a CCE with a smallest number (index) in the L CCEs.

The foregoing PDCCH candidate is used as an example for description. Two adjacent PDCCH candidates may be represented as PDCCH candidates numbered m and m+1 in a search space.

It may be obtained, according to the foregoing formulas (1) and (2), that a difference between numbers (index) of start CCEs of two PDCCH candidates whose numbers are adjacent in the search space corresponding to an aggregation level of L is equal to a fixed value L. In other words, the difference is equal to a size of the aggregation level. In other words, numbers of CCEs included in $M^{(L)}$ PDCCH candidates are continuous. Quantities of control channel candidates included in search spaces of PDCCHs whose aggregation levels are {1, 2, 4, 8} are respectively {6, 6, 2, 2}. FIG. 4A and FIG. 4B are schematic distribution diagrams of PDCCH candidates included in search spaces corresponding to different aggregation levels (AL). It may be learned that a search space corresponding to each aggregation level is independent. Two continuous PDCCH candidates are included in a search space corresponding to an AL8, two continuous PDCCH candidates are included in a search space corresponding to an AL4, six continuous PDCCH candidates are included in a search space corresponding to an AL2, and six continuous PDCCH candidates are included in a search space corresponding to an AL1. Because start locations of search spaces corresponding to aggregation levels are different in an entire control resource set, a quantity of overlapped CCEs included in different search spaces is random, and it is possible that CCEs included in different search spaces do not overlap with each other at all. As shown in FIG. 4A and FIG. 4B, resources of aggregation levels 2, 4, and 8 do not overlap with each other at all. For search spaces whose resources do not overlap with each other, new channel estimation should be performed once each time blind detection is performed. Therefore, a quantity of times of channel estimation is increased, and processing burden of the processor is increased.

Figure 5A:
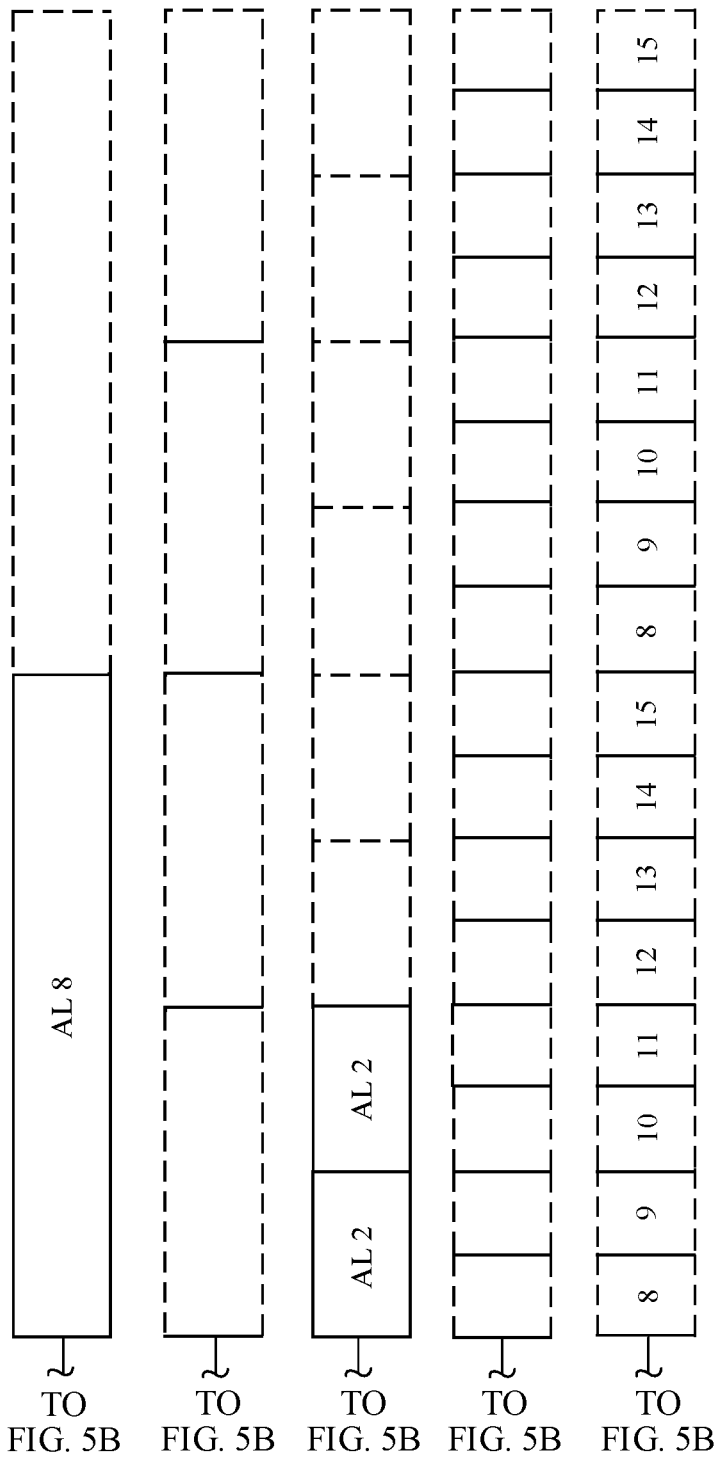
FIG. 5A and FIG. 5B are schematic distribution diagrams of PDCCH candidates included in search spaces corresponding to different aggregation levels when start locations are aligned.
Figure 5B:
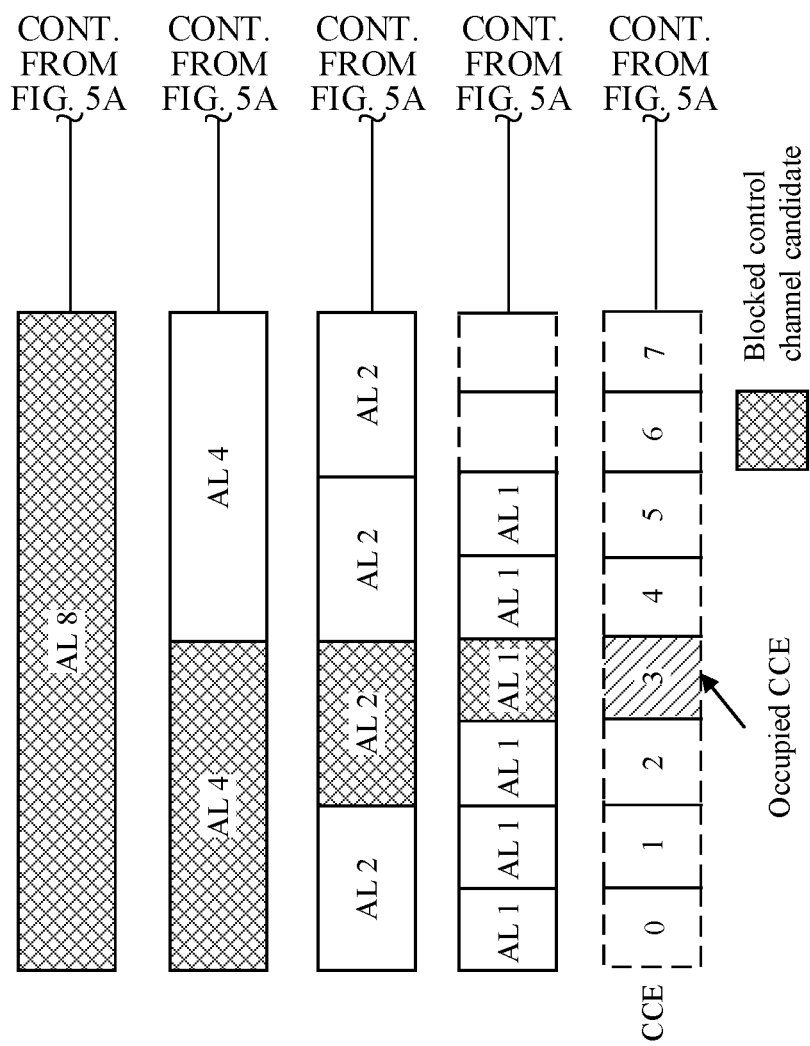
Figure 6:
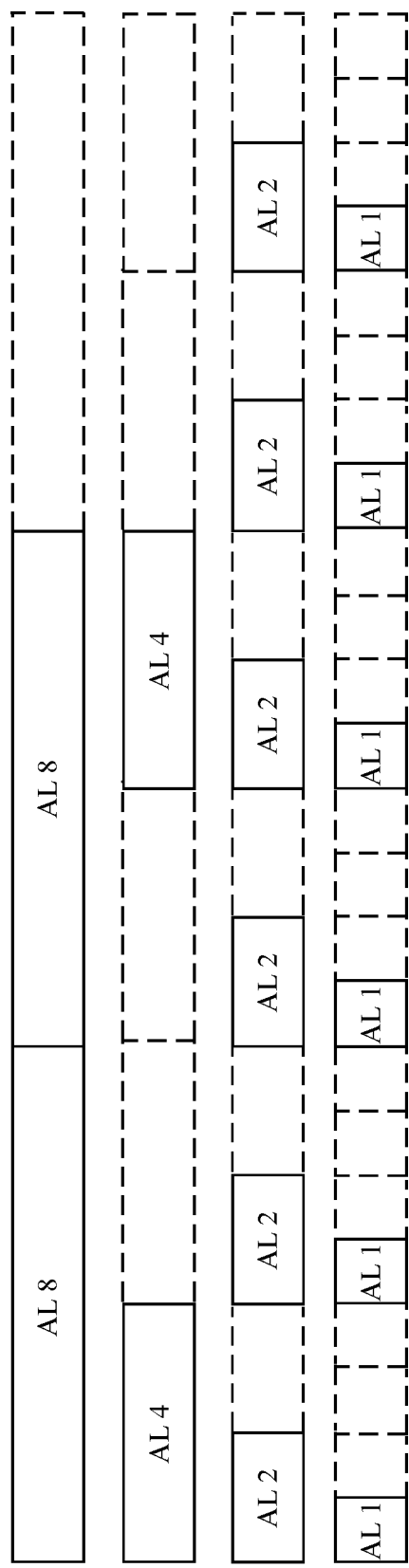
FIG. 6 is a schematic distribution diagram of EPDCCH candidates included in search spaces corresponding to different aggregation levels according to an embodiment of the present disclosure.

In another aspect, in formula (1), if the start locations of the randomly configured search spaces corresponding to the aggregation levels are just aligned, as shown in FIG. 5A and FIG. 5B, CCEs included in a search space corresponding to a low aggregation level are a subset of CCEs included in a search space corresponding to a maximum aggregation level. Because a large quantity of CCEs included in different search spaces overlap with each other, during blind detection performed a plurality of times, channel estimation is performed once on a same CCE included in search spaces corresponding to different aggregation levels, so that multiplexing of channel estimation can be implemented, thereby reducing a quantity of times of channel estimation and reducing processing complexity. However, in this case, a CCE included in a control channel candidate in the search spaces is used to send a control channel of another terminal device, and therefore, none of control channel candidates including the CCE in the search spaces can be used to send the control channel. Such case in which the control channel of the another terminal device cannot be sent is also referred to as blocking. For example, when a CCE #3 corresponding to an AL1 is used to send control information for another terminal device, none of PDCCH candidates that include the CCE #3 and whose aggregation levels are 1, 2, 4, and 8 can be further used to send the control channel for the terminal device. Therefore, available resources of the search spaces of the terminal device are rapidly reduced, a data scheduling requirement of the terminal device can be met, and a latency of data transmission is increased. In addition, the control channel becomes a system capacity bottleneck, and consequently, spectrum utilization of data transmission is reduced.

Similarly, the same problem exists in formula (3). A difference between formula (3) and formula (1) is that numbers of CCEs of adjacent control channel candidates that meet formula (3) are discrete, but a plurality of control channel candidates included in one search space are distributed in an entire control resource set at approximately equal intervals. For such regular distribution, it is highly possible that search spaces of different terminal devices completely overlap with each other. Therefore, even if a method of formula (2) is used to obtain the search space, a problem of a large control channel blocking probability is still unresolved. In addition, for search spaces determined according to formula (3), the CCEs included in the search space corresponding to the low aggregation level are still not necessarily a subset of CCEs included in the search space corresponding to the maximum aggregation level. In other words, it is possible that CCEs included in different search spaces do not overlap with each other. Therefore, the problem that a quantity of times of channel estimation is increased and burden of the processor is increased is still unresolved.

Therefore, if formula (1) and formula (3) are still used in an NR system, when the terminal device performs blind detection on the control channel, multiplexing of channel estimation during blind detection performed a plurality of times and/or demodulation of a received signal cannot be implemented, and complexity of the blind detection is high. In addition, because control channel candidates are continuously or regularly distributed in a set of CCEs in different search spaces, a quantity of same CCEs included in search spaces of different terminal devices is increased, thereby causing a large probability of mutual blocking in the search spaces of the different terminal devices.

To resolve the foregoing problem, in this embodiment of the present disclosure, the search space is redesigned, so that the search space corresponding to the low aggregation level can be nested in the search space corresponding to the maximum aggregation level. In other words, the CCEs included in the search space corresponding to the low aggregation level are a subset of the CCEs included in the search space corresponding to the maximum aggregation level, so that complexity of channel estimation is reduced. In addition, control channel candidates in the search space corresponding to the low aggregation level may be discretely and unevenly distributed in the CCEs included in the search space corresponding to the maximum aggregation level. Because of such discrete and uneven distribution, a quantity of same CCEs included in search spaces of different terminal devices is further reduced, thereby reducing a blocking probability.

An embodiment of the present disclosure provides a search space. The search space is included in a control resource set. The control resource set may be a set of resources that carry a control channel. The control resource set is corresponding to at least two aggregation levels. The at least two aggregation levels include a first aggregation level and a maximum aggregation level. The maximum aggregation level is the highest level of the at least two aggregation levels. Apparently, the first aggregation level is less than the maximum aggregation level. The at least two aggregation levels may be at least two values in 1, 2, 4, and 8, or may be at least two values in 1, 2, 4, 8, and 16, or may be at least two values in 1, 2, 4, 8, 16, and 32, or may be another integer, such as 64 or another value.

In addition, in this embodiment of the present disclosure, when there are a plurality of control resource sets, each control resource set is corresponding to at least two aggregation levels. Some or all of the at least two aggregation levels corresponding to the at least two control resource sets in the plurality of control resource sets may be different, or certainly, may be completely the same. For example, if aggregation levels corresponding to a control resource set 1 are 1, 2, and 4, the maximum aggregation level corresponding to the control resource set 1 is 4. If aggregation levels corresponding to a control resource set 2 are 1, 2, 4, and 8, the maximum aggregation level corresponding to the control resource set 2 is 8. In addition, each aggregation level is corresponding to one search space. In other words, aggregation levels of control channel candidates included in each search space are the same.

For ease of description, in this embodiment of the present disclosure, a search space corresponding to the first aggregation level is referred to as a first search space, and a search space corresponding to the maximum aggregation level is referred to as a second search space. It should be noted that "first" and "second" herein are merely used to easily describe and distinguish between different search spaces, and do not represent any limitation on a sequence or the like.

In addition, it should be noted that the control channel resource in this embodiment of the present disclosure is a control channel resource configured for a terminal device. Therefore, the control channel resource is referred to as a control channel resource of the terminal device. A same control channel resource or different control channel resources may be configured for different terminal devices. When a same control resource set is configured for different terminal devices, aggregation level sets corresponding to same control channel resources of the different terminal devices may be the same or different. Each aggregation level set includes at least two aggregation levels. Quantities of aggregation levels included in different aggregation level sets may be the same or different. This is not limited in this embodiment of the present disclosure.

In the design in this embodiment of the present disclosure, CCEs included in the first search space are a subset of CCEs included in the second search space. Further, when the first search space includes a plurality of control channel candidates, the plurality of control channel candidates included in the first search space are discretely distributed in the CCEs included in the second search space, and the plurality of control channel candidates may be unevenly distributed in the CCEs included in the second search space.

For ease of description below, symbols used in this embodiment of the present disclosure are first described herein. It should be noted that these symbols are merely an example, and parameters representing a same physical meaning may be also represented by using other symbols. Certainly, these parameters in this embodiment of the present disclosure may be also represented by using other symbols.

$L_{MAX}$ is a positive integer and represents a maximum aggregation level, namely, the aggregation level corresponding to the second search space.

$M^{(L_{MAX})}$ is a positive integer and represents a quantity of control channel candidates included in the second search space, namely, a quantity of control channel candidates included in the search space corresponding to the maximum aggregation level $L_{MAX}$.

$L_{MAX} \cdot M^{(L_{MAX})}$ represents a quantity of CCEs included in the search space corresponding to the maximum aggregation level $L_{MAX}$, namely, a quantity of CCEs included in the second search space.

$N_{CCE}$ represents a quantity of CCEs included in the control resource set.

Herein, $\alpha$ is a parameter, and $\alpha$ meets a relation that a maximum common divisor of $\alpha$ and $$\left\lfloor \frac{N_{CCE}}{L_{MAX}} \right\rfloor$$

is 1, and is a positive integer. Optionally, $\alpha$ may be a positive integer greater than 1.

Y represents a parameter related to an identifier of the terminal device or a preset value.

Herein, $\beta$ is a parameter, and $\beta$ meets a relation that a maximum common divisor of $\beta$ and $$\left\lfloor \frac{L_{MAX} \cdot M^{(L_{MAX})}}{L} \right\rfloor$$

is 1. It should be noted that values of $\alpha$ and $\beta$ may be the same or different.

L represents the first aggregation level.

$M^{(L)}$ represents a quantity of control channel candidates included in the first search space.

K represents a parameter related to an identifier of the terminal device or a preset value.

Herein, l is an integer and l is a parameter related to $L_{MAX}$. Optionally, l may be a number of a start CCE of a first control channel candidate in the second search space. Certainly, l may be alternatively a number of a CCE at another location.

Herein, $l_{m'}$ is an integer and l is a parameter related to $L_{MAX}$. Optionally, $l_{m'}$ is a number of a start CCE of an $(m'+1)^{th}$ control channel candidate in the second search space. Certainly, $l_{m'}$ may be alternatively a number of a CCE at another location of the $(m'+1)^{th}$ control channel candidate, where m'=0,L, $M^{(L_{MAX})}-1$.

$K_l$ is a parameter related to an identifier of the terminal device or a preset value.

It should be noted that if the foregoing Y, K, and $K_l$ are preset values, the three values may be the same, or some of the three values are the same, or all of the three values are different. For example, for a CSS, the three values may be preset values.

If the foregoing Y, K, and $K_l$ are parameters related to the identifier of the terminal device, manners of obtaining the three values may be the same, or some of the manners of obtaining the three values may be the same, or all of the manners of obtaining the three values may be different. A specific obtaining manner is further described below and a terminal device-specific search space is used as an example.

The first search space and the second search space provided in this embodiment of the present disclosure may be independent of each other. To be specific, only a design of the first search space provided in this embodiment of the present disclosure may be used, and the second search space may be designed by using a method in the prior art, or by using another manner different from that in the prior art. Similarly, only a design of the second search space provided in this embodiment of the present disclosure may be used, and the first search space may be designed by using a method in the prior art, or by using another manner different from that in the prior art. Certainly, the first search space and the second search space provided in this embodiment of the present disclosure may be used.

In a possible design of this embodiment of the present disclosure, the second search space is determined based on a parameter $\alpha$, and $\alpha$ meets a relation that a maximum common divisor of $\alpha$ and $$\left\lfloor \frac{N_{CCE}}{L_{MAX}} \right\rfloor$$

is 1. Further, $\alpha$ may be a positive integer greater than 1. In this manner, when the second search space includes a plurality of control channel candidates, the plurality of control channel candidates may be discretely distributed in CCEs included in the search space corresponding to the maximum aggregation level, and may be also unevenly distributed in the CCEs included in the search space corresponding to the maximum aggregation level. Because of this discrete and uneven distribution, a quantity of same CCEs included in search spaces of different terminal devices is further reduced, thereby reducing a blocking probability. Optionally, numbers of CCEs included in $M^{(L_{MAX})}$ control channel candidates included in the second search space meet formula (4):

$$L_{MAX}\{Y + \alpha \cdot m'\} \mod \left\lfloor \frac{N_{CCE}}{L_{MAX}} \right\rfloor + i. \qquad (4)$$

Herein, i=0,L, $L_{MAX}-1$, and m'=0,L, $M^{(L_{MAX})}-1$. Formula (4) may be understood as a number of a CCE i of a control channel candidate m', namely, a number of an $(i+1)^{th}$ CCE of an $(m'+1)^{th}$ control channel candidate.

When $\alpha$ is a positive integer greater than 1, in a second search space that meets formula (4), control channel candidates may be discretely and unevenly distributed in the control resource set.

Figure 7:
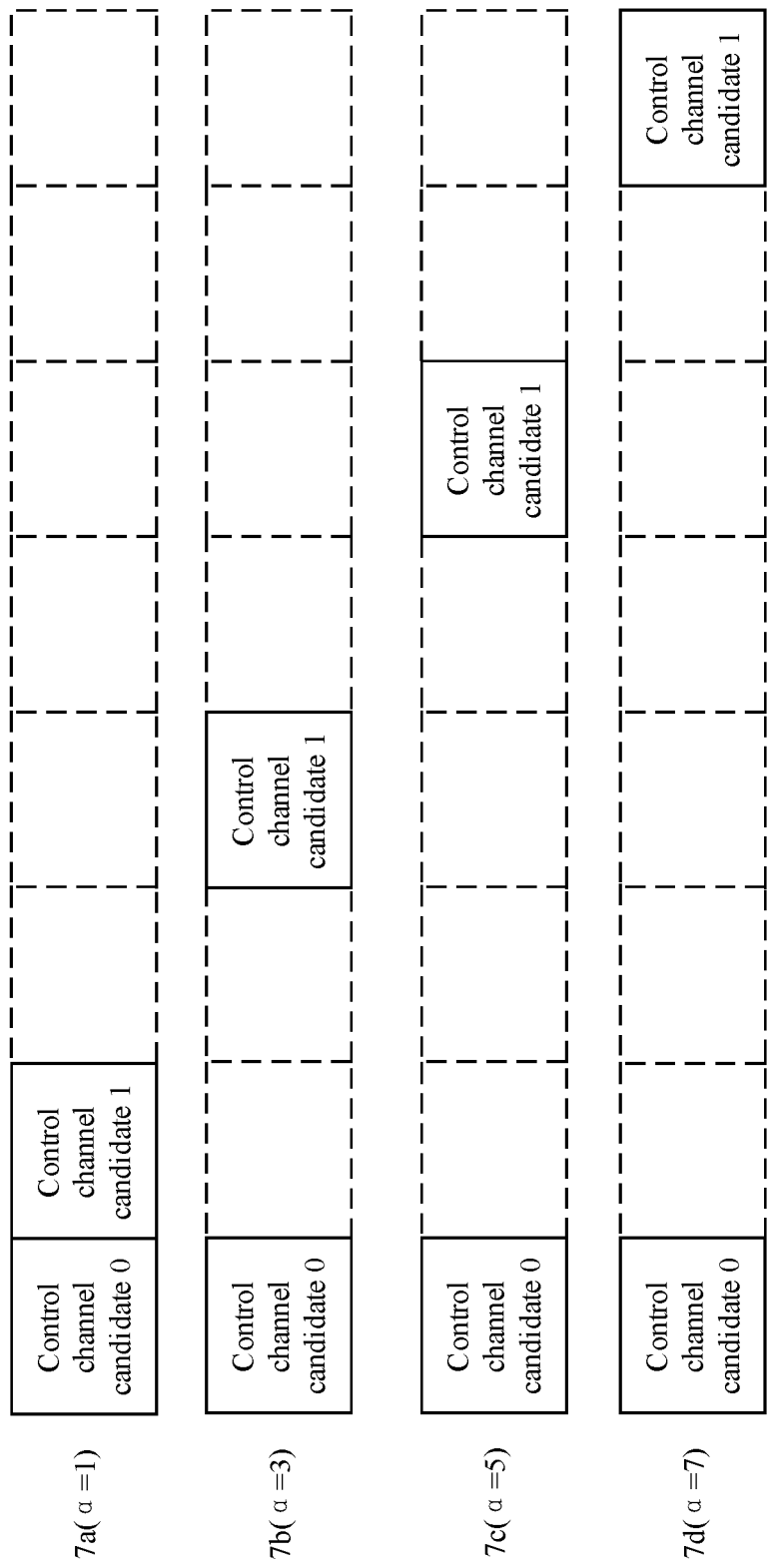
FIG. 7 is a schematic distribution diagram of control channel candidates included in second search spaces corresponding to different values of a according to an embodiment of the present disclosure.

The following uses an example to describe a resource distribution status of a possible second search space in this embodiment of the present disclosure. In this example, that Y=0 (Y may be alternatively another value, and this is not limited herein), $L_{MAX}=8$, and $N_{CCE}=64$ is used as an example for description. In this case, $$\left\lfloor \frac{N_{CCE}}{L_{MAX}} \right\rfloor = 8,$$

a possible value of $\alpha$ may be a value in a set $\{1, 3, 5, 7\}$. Certainly, the possible value of $\alpha$ is not limited thereto, or may be another value. This is not limited in this embodiment of the present disclosure. FIG. 7 is a schematic distribution diagram of control channel candidates included in second search spaces corresponding to different values of $\alpha$. When $M^{(L_{MAX})}$ is 2, a schematic diagram of search spaces for different values of $\alpha$ may be shown in FIG. 7. It can be learned that when $\alpha$ is 1, a difference between start CCEs of two control channel candidates with adjacent numbers is $L^{MAX}$. In other words, numbers of CCEs of adjacent control channel candidates are continuous. When $\alpha$ is 3, a difference between start CCEs of two control channel candidates with adjacent numbers is $3*L_{MAX}$. In other words, numbers of CCEs of adjacent control channel candidates are discontinuous, and there are $2*L_{MAX}$ CCEs between the two control channel candidates. When α is 5, a difference between start CCEs of two control channel candidates with adjacent numbers is $5*L_{MAX}$. In other words, numbers of CCEs of adjacent control channel candidates are discontinuous, and there are $4*L_{MAX}$ CCEs between the two control channel candidates. When α is 7, a difference between start CCEs of two control channel candidates with adjacent numbers is $7*L_{MAX}$. In other words, numbers of CCEs of adjacent control channel candidates are discontinuous, and there are $6*L_{MAX}$ CCEs between the two control channel candidates.

Optionally, Y in formula (4) is a parameter related to an identifier of the terminal device or a preset value. When Y is a preset value, Y may be a constant, such as a positive integer. In this case, the search space may be a common search space. When Y is a parameter related to the identifier of the terminal device, the search space may be a search space dedicated to the terminal device. In this case, a value of Y may meet a recursive function C(j). For example, the value of Y may be calculated by using the recursive function. The recursive function C(j) may be expressed as formula (5):

$$C(j)=(A_Y \cdot C(j-1)) \bmod D \quad (5).$$

Herein, $C(-1)=n_{RNTI}\neq 0$, $A_Y$ is a characteristic parameter, and D is a constant, for example, D=65537, and j may be a value related to a slot number (slot index) or a number of an orthogonal frequency division multiplexing (orthogonal frequency division multiplexing, OFDM) symbol; and $j \in \{0, 1 \ldots, J-1\}$, where J is a quantity of possible values of j, for example, a quantity of slots in a radio frame or a quantity of OFDM symbols in a radio frame. Herein, $n_{RNTI}$ is an RNTI of a different type, namely, an identifier of the terminal device. If a value corresponding to a given slot or OFDM symbol is $j_0$, and $j_0 \in \{0, 1, \ldots, J-1\}$, a value of a search space on the slot or the OFDM symbol is as follows: $Y=C(j_0)$.

In the formula, $A_Y$ is an integer, and may be a fixed value, or certainly may be a variable value. If the value is a variable value, a value of the characteristic parameter $A_Y$ may be a value corresponding to the maximum aggregation level. Certainly, the value of $A_Y$ may be determined based on the aggregation level and a correspondence between the maximum aggregation level and $A_Y$. Alternatively, the value of $A_Y$ may be determined based on a control resource set. For example, the value of $A_Y$ is related to an index of the configured control resource set. If a control resource set 0 and a control resource set 1 are configured, and the control resource set 0 and the control resource set 1 are respectively corresponding to a control resource set index 0 and a control resource set index 1, for the control resource set index 0, a value of $A_Y$ is 39820; and for the control resource set index 1, a value of $A_Y$ is 39810. Indexes of different control resource sets are different. In this way, locations of a search space of a same terminal device in different control resource sets are different, thereby reducing a probability that search spaces of a terminal device and search spaces of another terminal device overlap in two different control resource sets.

Alternatively, the value of $A_Y$ may be configured, and values of $A_Y$ that are corresponding to different control resource set indexes may be configured by using higher layer signaling. When configured values of $A_Y$ that are corresponding to different control resource sets are the same, locations of CCEs of search spaces included in the different control resource sets are the same. In this way, the terminal device does not need to recalculate locations of the search spaces in different control resource sets, thereby helping the terminal device simultaneously perform joint detection on control channel candidates in two control resource sets or combine detection signals of control channel candidates in different control resource sets.

In this embodiment, second search spaces that meet formula (4) may be discretely and unevenly distributed. In other words, control channel candidates in the second search space are randomly distributed. Compared with a search space in which control channel candidates are continuously distributed or evenly distributed, a probability that a CCE included in the search space, of the terminal device, corresponding to the maximum aggregation level overlaps with a CCE included in a search space, of the another terminal device, corresponding to a maximum aggregation level is reduced to some extent, thereby reducing a blocking probability.

In another possible design in this embodiment of the present disclosure, the first search space is related to the maximum aggregation level. That the first search space designed in this embodiment of the present disclosure is related to the maximum aggregation level may mean that the first search space designed in this embodiment of the present disclosure is related to the maximum aggregation level, but the first search space designed in this embodiment of the present disclosure is unrelated to a quantity of control channel candidates included in the second search space. In this manner, CCEs included in the first search space may be a subset of CCEs included in the second search space. In other words, the first search space is nested in the second search space, and control channel candidates included in the first search space may be discretely and unevenly distributed in the CCEs included in the second search space. In this nesting design, complexity of channel estimation can be reduced, and in this uneven and discrete design, a blocking probability can be reduced. Further, numbers of CCEs included in the second search space may be continuous or discrete. A blocking probability in search spaces of different terminal devices may be further reduced.

In still another possible design in this embodiment of the present disclosure, the first search space is related to a quantity of CCEs included in the search space corresponding to the maximum aggregation level. In other words, the first search space is related to a quantity of CCEs included in the second search space. To be specific, the first search space is related to not only the maximum aggregation level, but also a quantity of control channel candidates included in the second search space. In this manner, control channel candidates in the first search space can be discretely and unevenly distributed in the second search space. Further, numbers of the CCEs included in the second search space may be continuous. In the method, a blocking probability can be reduced, and the method is easy to implement.

In the foregoing design, it can be ensured that resources included in the first search space are a subset of resources included in the second search space. In other words, a search space corresponding to a low aggregation level can be nested in the search space corresponding to the maximum aggregation level. To be specific, CCEs included in the search space corresponding to the low aggregation level are a subset of CCEs included in the search space corresponding to the maximum aggregation level, so that complexity of channel estimation is reduced. In addition, control channel candidates in the search space corresponding to the low aggregation level may be discretely and unevenly distributed in the CCEs included in the search space corresponding to the maximum aggregation level. Because of such discrete and uneven distribution, a quantity of same CCEs included in search spaces of different terminal devices is further reduced, thereby reducing a blocking probability.

It should be noted that, in this embodiment of the present disclosure, that the control channel candidates are discretely and unevenly distributed means that numbers of CCEs of control channel candidates with adjacent numbers are discontinuous. Such discrete and uneven distribution indicates that numbers of CCEs of adjacent control channel candidates are discontinuous, and a difference between a number of a start CCE of a control channel candidate numbered x and a number of a start CCE of a control channel candidate numbered x+1 is different from a difference between a number of a start CCE of a control channel candidate numbered y and a number of a start CCE of a control channel candidate numbered y+1, or in adjacent control channel candidates, a difference between a number of the last CCE of a control channel candidate numbered x and a number of a start CCE of a control channel candidate numbered x+1 is different from a difference between a number of the last CCE of a control channel candidate numbered y and a number of a start CCE of a control channel candidate numbered y+1. Discrete distribution and uneven distribution indicate a same meaning below.

Further, in this embodiment of the present disclosure, the first search space may be further related to the foregoing parameter β.

Optionally, α and β may be different. In this way, discrete distribution degree of the first search space can be different from discrete distribution degree of the second search space, so that a blocking probability can be reduced as much as possible.

For example, α=1 and β>α. In this case, control channel candidates included in the second search space are continuously distributed in the control resource set, and the control channel candidates included in the first search space are discretely and unevenly distributed in CCEs included in the second search space. FIG. 8A and FIG. 8B are possible schematic distribution diagrams of control channel candidates of first search spaces corresponding to aggregation levels of 4, 2 and 1 and a second search space corresponding to an aggregation level of 8 according to an embodiment of the present disclosure. The method is easy to implement, and can help reduce complexity of channel estimation and a blocking probability.

For another example, 1<β<α. In this case, the control channel candidates included in the first search space and the second search space are discretely and unevenly distributed in the control resource set. In this case, distribution of the control channel candidates included in the second search space is sparser than that of the control channel candidates included in the first search space. When the control channel candidates are centrally mapped to a resource element group, physical resources in which different control channel candidates in the second search space are located are more sparsely scattered in an entire control resource set, to obtain a frequency diversity gain. In this case, FIG. 9A and FIG. 9B are possible schematic distribution diagrams of control channel candidates of a first search space corresponding to an aggregation level of 1 and a second search space corresponding to an aggregation level of 2 according to an embodiment of the present disclosure.

Figure 10A:
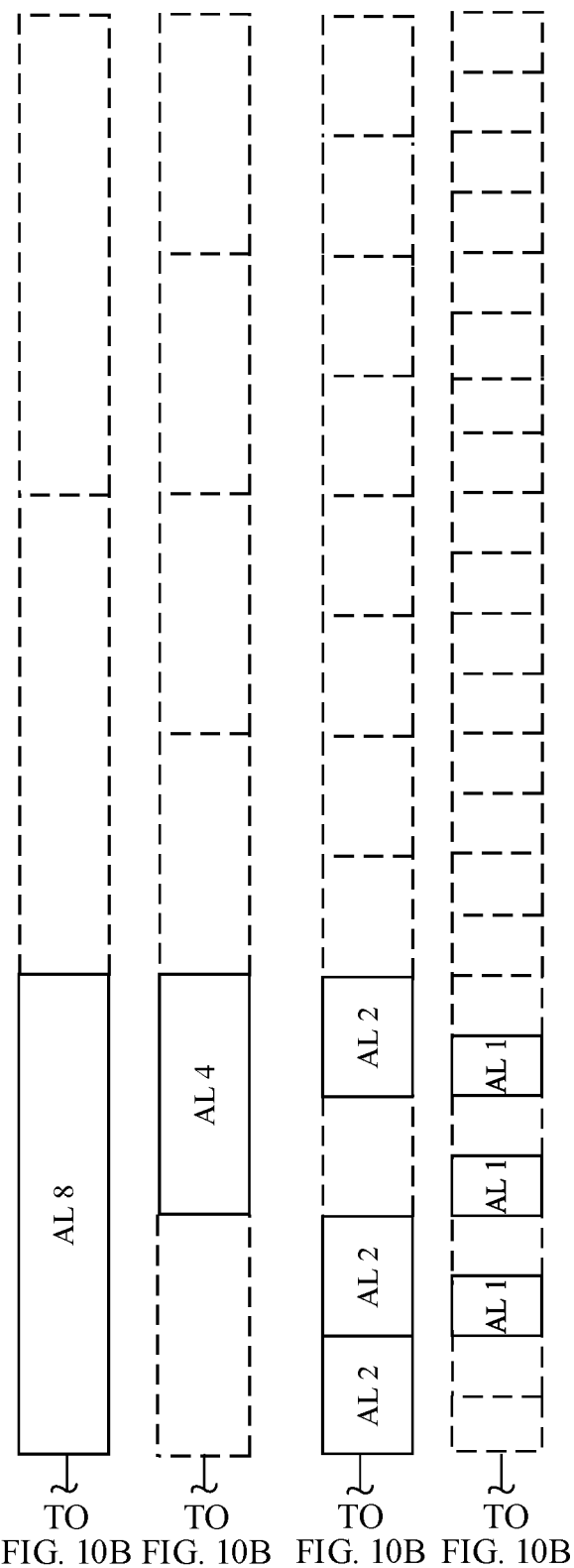

For example, 1<α<β. In this case, the control channel candidates included in the first search space and the second search space are discretely and unevenly distributed in the control resource set. The control channel candidates included in the second search space are more discretely and unevenly distributed in resources included in the first search space. Compared with the continuous distribution manner for the second search space, this implementation may further help reduce a blocking probability. FIG. 10A and FIG. 10B are other possible schematic distribution diagrams of control channel candidates of first search spaces corresponding to aggregation levels of 4, 2 and 1 and a second search space corresponding to an aggregation level of 8 according to an embodiment of the present disclosure.

In the foregoing first manner, that is, when the first search space is related to the maximum aggregation level, in still another optional implementation, numbers of CCEs included in $M^{(L)}$ control channel candidates included in the first search space may meet formula (6):

$$L\{K+\beta \cdot m\} \bmod \left\lfloor \frac{L_{MAX}}{L} \right\rfloor + i + l_{m'}, \quad (6)$$

where

K is a parameter related to an identifier of the terminal device or a preset value, i=0,L, L−1, m=0,L, $M^{(L)}$−1, $M^{(L)}$ is a quantity of control channel candidates included in the first search space, and $l_{m'}$ is an integer.

For example, when the maximum aggregation level $L_{MAX}$=8, if the search space corresponding to the maximum aggregation level includes two control channel candidates, numbers of CCEs included in a first control channel candidate with the maximum aggregation level are {8, 9, 10, 11, 12, 13, 14, 15}, and numbers of CCEs included in a second control channel candidate with the maximum aggregation level are {16, 17, 18, 19, 20, 21, 22, 23}. Therefore, a number of an $(m'+1)^{th}$ control channel candidate with the maximum aggregation level and a number of a start CCE of the $(m'+1)^{th}$ control channel candidate with the maximum aggregation level may be shown in Table 1:

TABLE 1

| $(m'+1)^{th}$ control channel candidate with a maximum aggregation level | Number of a start CCE of the $(m'+1)^{th}$ control channel candidate |
|---|---|
| 0 | 8 |
| 1 | 16 |

A relationship between the start CCE of the $(m+1)^{th}$ control channel candidate included in the first search space and a number m' of a control channel candidate that is corresponding to the start CCE and that has the maximum aggregation level may be determined based on a maximum or minimum number of a CCE, relative to the start CCE of the $(m+1)^{th}$ control channel candidate, included in each control channel candidate in the second search space.

Optionally, the relationship between the start CCE of the $(m'+1)^{th}$ control channel candidate included in the first search space and a number m' of a control channel candidate that is corresponding to the start CCE and that has the maximum aggregation level may be determined based on a difference between the number of the start CCE of the $(m'+1)^{th}$ control channel candidate and a maximum or minimum number of a CCE included in the $(m'+1)^{th}$ control channel candidate.

Alternatively, the relationship may be expressed as formula (7). A value of $l_{m'}$ is the number of the start CCE included in the $(m'+1)^{th}$ control channel candidate corresponding to the $(m+1)^{th}$ control channel candidate.

$$m' = \left\lfloor L\{K + \beta \cdot m\} \bmod \left\lfloor \frac{L_{MAX} \cdot M^{(L_{MAX})}}{L} \right\rfloor \bigg/ L_{MAX} \right\rfloor. \quad (7)$$

A relationship between m' and $l_{m'}$ is as follows:

If an aggregation level L of the first search space is equal to 1, $M^{(L)}=6$, and K=0, it can be learned that $$\left\lfloor \frac{L_{MAX} \cdot M^{(L_{MAX})}}{L} \right\rfloor = 16.$$

When β=5, a correspondence between m' and the $(m+1)^{th}$ control channel candidate in the first search space may be obtained by using formula (7), and results are shown in the following Table 2:

TABLE 2

| $(m + 1)^{th}$ control channel candidate | m' | Number of a start CCE of an $(m' + 1)^{th}$ control channel candidate |
|---|---|---|
| m = 0 | 0 | 8 |
| m = 1 | 0 | 8 |
| m = 2 | 1 | 16 |
| m = 3 | 1 | 16 |
| m = 4 | 0 | 8 |
| m = 5 | 1 | 16 |

A correspondence between a control channel candidate m and a number of a CCE is shown in the following Table 3:

TABLE 3

| $(m + 1)^{th}$ control channel candidate | Number of a CCE included in a control channel candidate m | $l_{m'}$ |
|---|---|---|
| m = 0 | {0 + $l_{m'}$} | 8 |
| m = 1 | {5 + $l_{m'}$} | 8 |
| m = 2 | {2 + $l_{m'}$} | 16 |
| m = 3 | {7 + $l_{m'}$} | 16 |
| m = 4 | {4 + $l_{m'}$} | 8 |
| m = 5 | {1 + $l_{m'}$} | 16 |

Figures 11A, 11B:
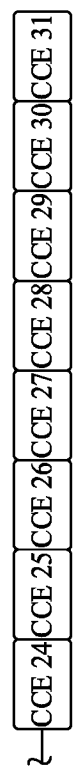
FIG. 11A to FIG. 11C are possible schematic distribution diagrams of CCEs of both a second search space and a first search space according to an embodiment of the present disclosure.
Figure 11B:
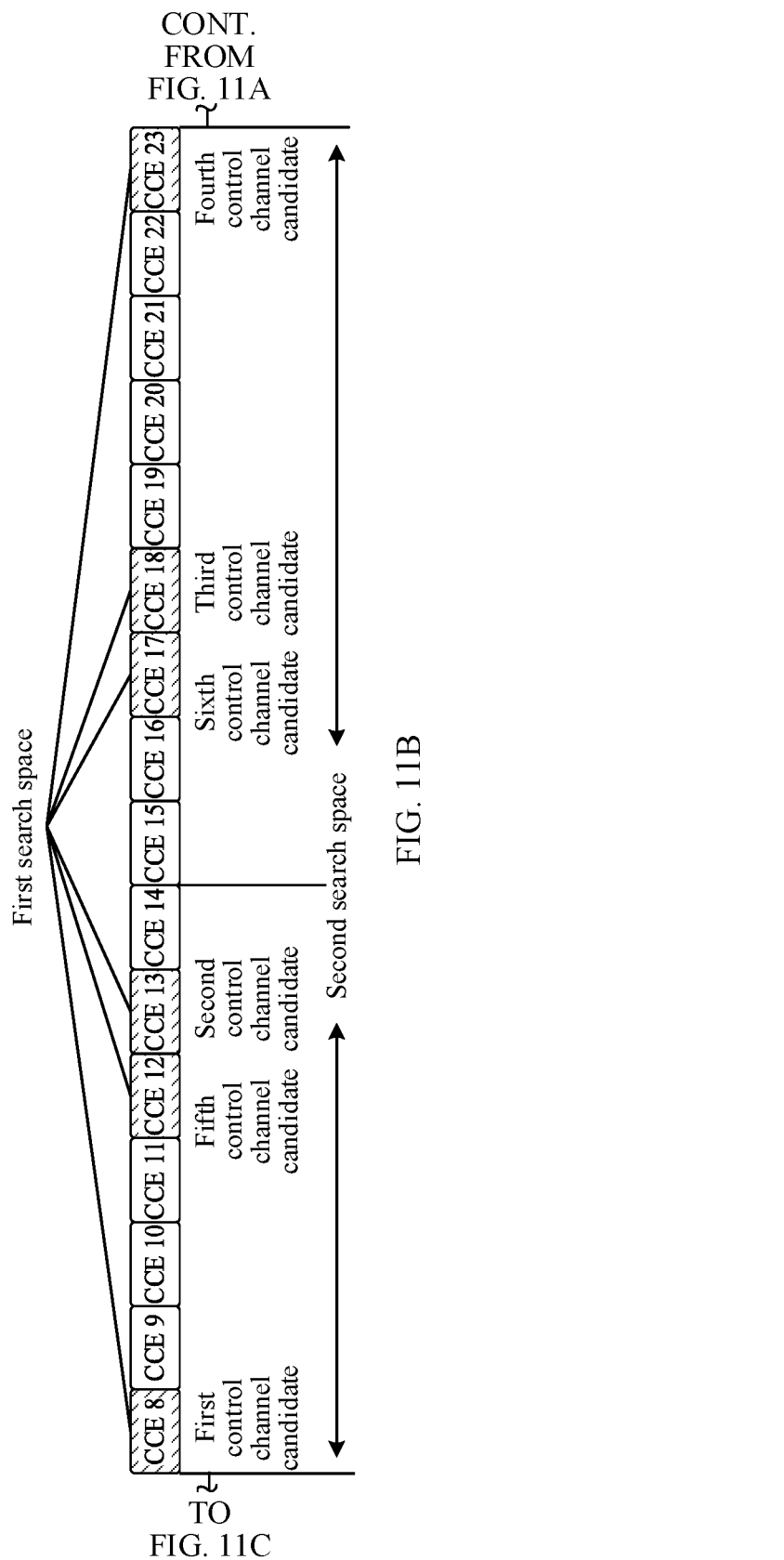
Figure 11C:

In this case, schematic distribution diagrams of CCEs in the first search space are shown in FIG. 11A to FIG. 11C. In still another implementation, control channel candidates included in a search space corresponding to the maximum aggregation level are discretely distributed in the control resource set. For example, numbers of CCEs included in a first control channel candidate with the maximum aggregation level are {0, 1, 2, 3, 4, 5, 6, 7}, and numbers of CCEs included in a second control channel candidate with the maximum aggregation level are {24, 25, 26, 27, 28, 29, 30, 31}. Similarly, a correspondence between a control channel candidate m in the first search space and a number of a CCE may be obtained by using formula (7) or another optional manner, and the correspondence is shown in the following Table 4:

TABLE 4

| $(m + 1)^{th}$ control channel candidate | Number of a CCE included in a control channel candidate m | $l_{m'}$ |
|---|---|---|
| m = 0 | {0 + $l_{m'}$} | 0 |
| m = 1 | {5 + $l_{m'}$} | 0 |
| m = 2 | {2 + $l_{m'}$} | 24 |
| m = 3 | {7 + $l_{m'}$} | 24 |
| m = 4 | {4 + $l_{m'}$} | 0 |
| m = 5 | {1 + $l_{m'}$} | 24 |

Figure 12:
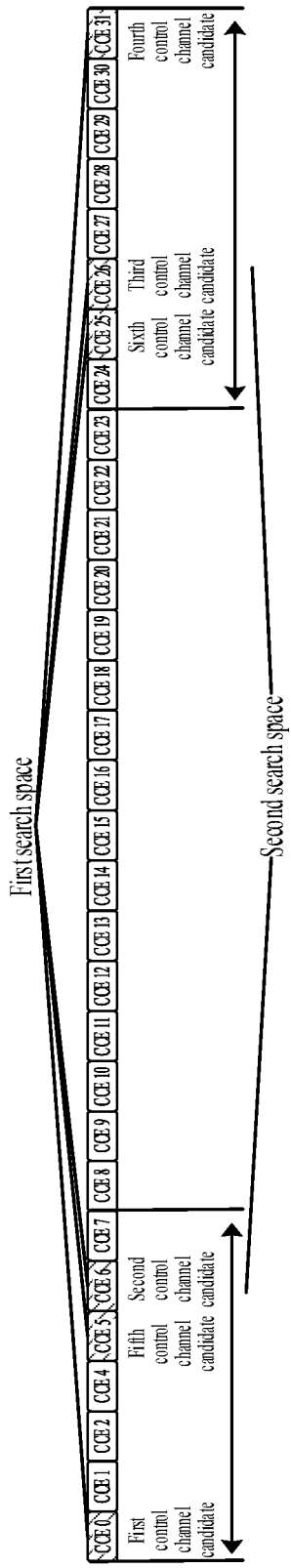
FIG. 12 is another possible schematic distribution diagram of CCEs of both a second search space and a first search space according to an embodiment of the present disclosure.

In this case, a schematic distribution diagram of CCEs in the first search space is shown in FIG. 12.

In the first search space that meets formula (6), no matter whether numbers of CCEs included in the second search space are continuous, both the second search space and the first search space can be discretely and unevenly distributed, thereby reducing a blocking probability to the maximum extent.

Further, in formula (6), $M^{(L)}$ may further meet the following relationship:

$$\beta \cdot M^{(L)} \geq \left\lfloor \frac{L_{MAX}}{L} \right\rfloor.$$

In this way, the first search space can obtain a better unevenness characteristic, and a blocking probability is reduced.

In the foregoing second manner, that is, when the first search space is related to a quantity of CCEs included in the search space corresponding to the maximum aggregation level, in still another optional implementation, numbers of CCEs included in $M^{(L)}$ control channel candidates included in the first search space may meet formula (8):

$$L\left\{K + \left\lfloor \frac{m \cdot L_{MAX} \cdot M^{(L_{MAX})}}{L \cdot M^{(L)}} \right\rfloor \right\} \bmod \left\lfloor \frac{L_{MAX}}{L} \right\rfloor + i + l_{m'}, \quad (8)$$

where i=0,L, L−1, and m=0,L, $M^{(L)}$−1.

Herein, $l_{m'}$ is a number of a start CCE of the $(m'+1)^{th}$ control channel candidate included in the second search space.

For example, when the maximum aggregation level $L_{MAX}=8$, if the search space corresponding to the maximum aggregation level includes two control channel candidates, where numbers of CCEs included in a first control channel candidate with the maximum aggregation level are {8, 9, 10, 11, 12, 13, 14, 15}, and numbers of CCEs included in a second control channel candidate with the maximum aggregation level are {16, 17, 18, 19, 20, 21, 22, 23}, a number of the $(m'+1)^{th}$ control channel candidate with the maximum aggregation level and the number of the start CCE of the $(m'+1)^{th}$ control channel candidate with the maximum aggregation level may be shown in Table 5:

TABLE 5

| $(m' + 1)^{th}$ control channel candidate with a maximum aggregation level | Number of a start CCE of an $(m' + 1)^{th}$ control channel candidate |
|---|---|
| 0 | 8 |
| 1 | 16 |

A relationship between the start CCE of the $(m+1)^{th}$ control channel candidate included in the first search space and a number m' of a control channel candidate that is corresponding to the start CCE and that has the maximum aggregation level may be determined based on a maximum or minimum number of a CCE, relative to the start CCE of the $(m+1)^{th}$ control channel candidate, included in each control channel candidate in the second search space.

Optionally, the relationship between the start CCE of the $(m+1)^{th}$ control channel candidate included in the first search space and a number m' of a control channel candidate that is corresponding to the start CCE and that has the maximum aggregation level may be determined based on a difference between the number of the start CCE of the $(m+1)^{th}$ control channel candidate and a maximum or minimum number of a CCE included in the $(m'+1)^{th}$ control channel candidate.

Alternatively, the relationship may be expressed as formula (9). A value of $l_{m'}$ is the number of the start CCE included in the $(m'+1)^{th}$ control channel candidate corresponding to the $(m+1)^{th}$ control channel candidate.

$$m' = \left\lfloor L\left\{K + \left\lfloor \frac{m \cdot L_{MAX} \cdot M^{(L_{MAX})}}{L \cdot M^{(L)}} \right\rfloor \right\} \bmod \left\lfloor \frac{L_{MAX} \cdot M^{(L_{MAX})}}{L} \right\rfloor / L_{MAX} \right\rfloor. \quad (9)$$

In this case, if the aggregation level L of the first search space is equal to 1, $M^{(L)}=6$, and K=0, it can be learned that $$\left\lfloor \frac{L_{MAX} \cdot M^{(L_{MAX})}}{L} \right\rfloor = 16,$$

and a correspondence between a control channel candidate m and a number of a CCE is shown in the following Table 6:

TABLE 6

| $(m + 1)^{th}$ control channel candidate | Number of a CCE included in a control channel candidate m | $l_{m'}$ |
|---|---|---|
| m = 0 | {0 + $l_{m'}$} | 8 |
| m = 1 | {2 + $l_{m'}$} | 8 |
| m = 2 | {5 + $l_{m'}$} | 8 |
| m = 3 | {0 + $l_{m'}$} | 16 |
| m = 4 | {2 + $l_{m'}$} | 16 |
| m = 5 | {5 + $l_{m'}$} | 16 |

Figures 13A, 13B:
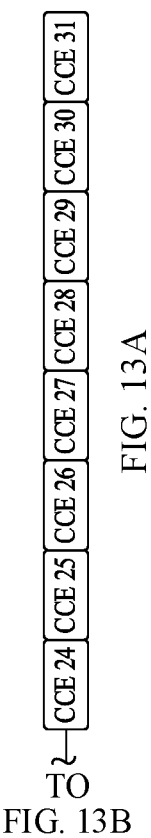
FIG. 13A to FIG. 13C are other possible schematic distribution diagrams of CCEs of both a second search space and a first search space according to an embodiment of the present disclosure.
Figure 13B:
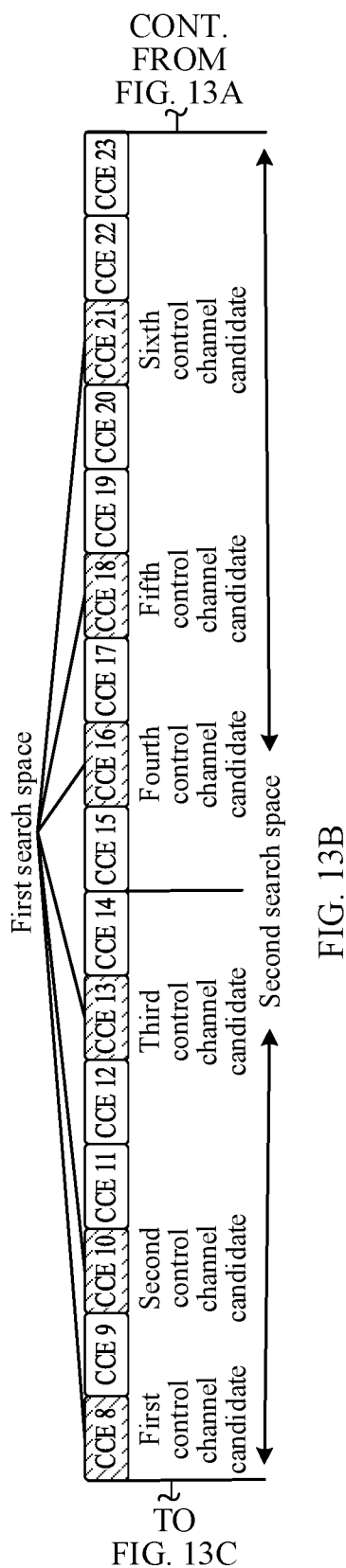
Figures 13B, 13C:

In this case, schematic distribution diagrams of CCEs in the first search space are shown in FIG. 13A to FIG. 13C.

In the first search space that meets formula (8), no matter whether numbers of CCEs included in the second search space are continuous, both the second search space and the first search space can be discretely and unevenly distributed, thereby reducing a blocking probability to the maximum extent.

In the foregoing second manner, that is, when the first search space is related to the quantity of CCEs included in the search space corresponding to the maximum aggregation level, in still another optional implementation, numbers of CCEs included in $M^{(L)}$ control channel candidates included in the first search space may meet formula (10):

$$\left\{L\left\{K + \left\lfloor \frac{m \cdot L_{MAX} \cdot M^{(L_{MAX})}}{L \cdot M^{(L)}} \right\rfloor \right\} \bmod \left\lfloor \frac{L_{MAX} \cdot M^{(L_{MAX})}}{L} \right\rfloor + l\right\} \quad (10)$$

$$\bmod \ N_{CCE} + i,$$

where i=0,L, L−1, and m=0,L, $M^{(L)}$−1.

Alternatively, formula (10) may be further expressed as formula (11):

$$L\left\{\left\{K + \left\lfloor \frac{m \cdot L_{MAX} \cdot M^{(L_{MAX})}}{L \cdot M^{(L)}} \right\rfloor \right\} \bmod \left\lfloor \frac{L_{MAX} \cdot M^{(L_{MAX})}}{L} \right\rfloor + \frac{l}{L}\right\} \quad (11)$$

$$\bmod \left\lfloor \frac{N_{CCE}}{L} \right\rfloor + i,$$

where l is a number of a start CCE in the CCEs included in the second search space.

For example, when the maximum aggregation level $L_{MAX}=8$ and $M^{(L_{MAX})}=2$, if the search space corresponding to the maximum aggregation level includes two control channel candidates, where numbers of CCEs included in a first control channel candidate with the maximum aggregation level are {8, 9, 10, 11, 12, 13, 14, 15}, and numbers of CCEs included in a second control channel candidate with the maximum aggregation level are {16, 17, 18, 19, 20, 21, 22, 23}, a number of the start CCE of the search space corresponding to the maximum aggregation level is 8, that is, l=8.

If the aggregation level L of the first search space is equal to 1, $M^{(L)}=6$, and K=0, it can be learned that $$\left\lfloor \frac{L_{MAX} \cdot M^{(L_{MAX})}}{L} \right\rfloor = 16,$$

and a correspondence between a control channel candidate m in the first search space and a number of a CCE is provided in the following Table 7:

TABLE 7

| $(m + 1)^{th}$ control channel candidate | Number of a CCE included in a control channel candidate m |
|---|---|
| m = 0 | 8 |
| m = 1 | 10 |
| m = 2 | 13 |
| m = 3 | 16 |
| m = 4 | 18 |
| m = 5 | 21 |

Figures 14A, 14B:
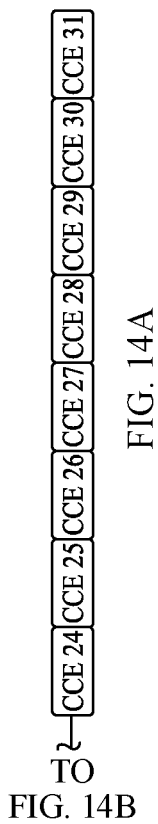
FIG. 14A to FIG. 14C are other possible schematic distribution diagrams of CCEs of both a second search space and a first search space according to an embodiment of the present disclosure.
Figure 14B:
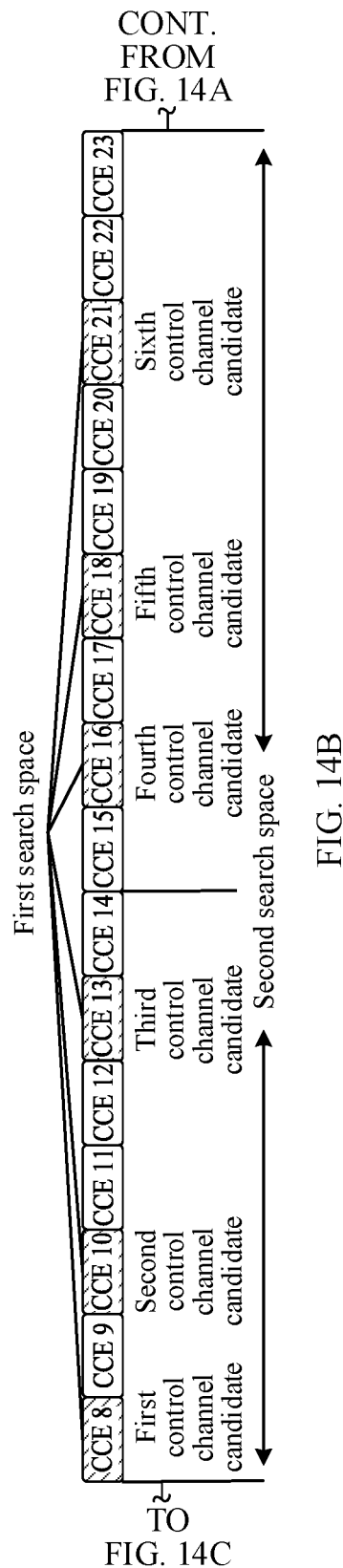
Figure 14C:

In this case, schematic distribution diagrams of CCEs in the first search space are shown in FIG. 14A to FIG. 14C.

When the foregoing manner is applied to a case in which numbers of CCEs included in the second search space are continuous, the foregoing manner is easy to implement, and can help reduce complexity of channel estimation and a blocking probability.

In the foregoing first manner, that is, when the first search space is related to the maximum aggregation level, in still another optional implementation, numbers of CCEs included in $M^{(L)}$ control channel candidates included in the first search space may meet formula (12):

$$L\left\{K_1 + \left\lfloor \frac{m \cdot L_{MAX}}{L \cdot M^{(L)}_{m'}} \right\rfloor \right\} \bmod \left\lfloor \frac{L_{MAX}}{L} \right\rfloor + i = l_{m'}, \quad (12)$$

where i=0,L, L−1, and m=0,L, $M^{(L)}$−1.

For example, when the maximum aggregation level $L_{MAX}=8$, if the search space corresponding to the maximum aggregation level includes two control channel candidates, where numbers of CCEs included in a first control channel candidate with the maximum aggregation level are {8, 9, 10, 11, 12, 13, 14, 15}, and numbers of CCEs included in a second control channel candidate with the maximum aggregation level are {16, 17, 18, 19, 20, 21, 22, 23}, a number of the (m'+1)$^{th}$ control channel candidate with the maximum aggregation level and a number of a start CCE of the (m'+1)$^{th}$ control channel candidate with the maximum aggregation level may be shown in Table 8:

TABLE 8

| (m' + 1)$^{th}$ control channel candidate with a maximum aggregation level | Number of a start CCE of an (m' + 1)$^{th}$ control channel candidate |
|---|---|
| 0 | 8 |
| 1 | 16 |

If m'=0, $M_{m'}^{(L)}$=3 (which represents a quantity of control channel candidates that are corresponding to a first aggregation level and that are in an m'$^{th}$ control channel candidate in the second search space), $l_{m'}$=8, and $K_l$=0; and a correspondence between m and a number of a CCE is shown in Table 9:

TABLE 9

| (m + 1)$^{th}$ control channel candidate | Number of a CCE included in a control channel candidate m | $l_{m'}$ |
|---|---|---|
| m = 0 | {0 + $l_{m'}$} | 8 |
| m = 1 | {2 + $l_{m'}$} | 8 |
| m = 2 | {5 + $l_{m'}$} | 8 |

If m'=0, $M_{m'}^{(L)}$=4, $l_{m'}$=16, and $K_l$=0. A correspondence between m and a number of a CCE is shown in Table 10:

TABLE 10

| (m + 1)$^{th}$ control channel candidate | Number of a CCE included in a control channel candidate m | $l_{m'}$ |
|---|---|---|
| m = 0 | {0 + $l_{m'}$} | 16 |
| m = 1 | {2 + $l_{m'}$} | 16 |
| m = 2 | {4 + $l_{m'}$} | 16 |
| m = 3 | {6 + $l_{m'}$} | 16 |

Figures 15A, 15B:
FIG. 15A to FIG. 15C are other possible schematic distribution diagrams of CCEs of both a second search space and a first search space according to an embodiment of the present disclosure.
Figure 15B:
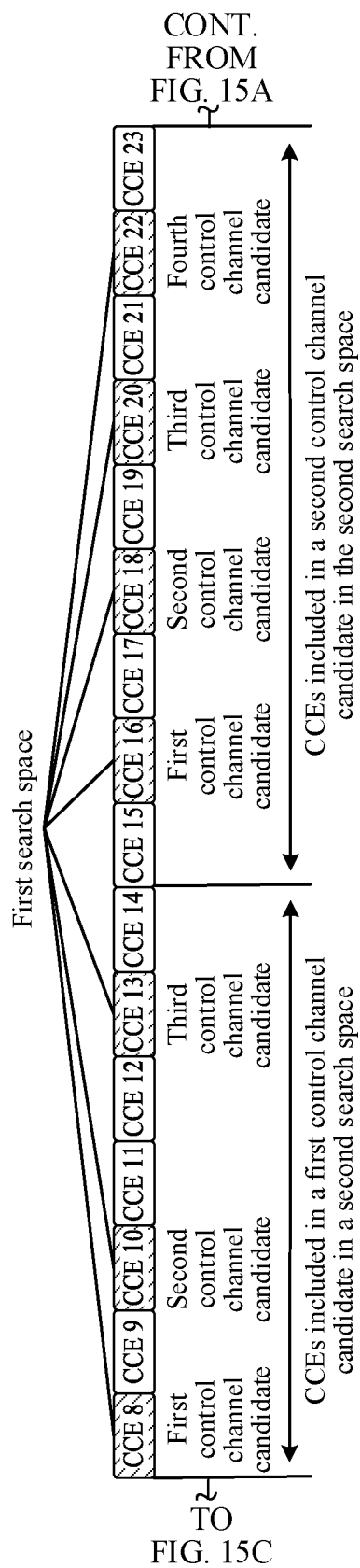
Figure 15C:

In this case, schematic distribution diagrams of CCEs in the first search space are shown in FIG. 15A to FIG. 15C.

In the foregoing second manner, that is, when the first search space is related to the quantity of CCEs included in the search space corresponding to the maximum aggregation level, in still another optional implementation, numbers of CCEs included in $M^{(L)}$ control channel candidates included in the first search space may meet formula (13):

$$\left\{L\{K + \beta \cdot m\} \mod \left\lfloor \frac{L_{MAX} \cdot M^{(L_{MAX})}}{L} \right\rfloor + l \right\} \mod N_{CCE} + i, \quad (13)$$

where i=0,L, L−1, and m=0,L, $M^{(L)}$−1.

Alternatively, formula (13) may be further expressed as formula (14):

$$L\left\{\{K + \beta \cdot m\} \mod \left\lfloor \frac{L_{MAX} \cdot M^{(L_{MAX})}}{L} \right\rfloor + \frac{l}{L} \right\} \mod \left\lfloor \frac{N_{CCE}}{L} \right\rfloor + i, \quad (14)$$

where l is a number of a start CCE included in the second search space.

For example, when the maximum aggregation level $L_{MAX}$=8 and $M^{(L_{MAX})}$=2, if the search space corresponding to the maximum aggregation level includes two control channel candidates, where numbers of CCEs included in a first control channel candidate with the maximum aggregation level are {8, 9, 10, 11, 12, 13, 14, 15}, and numbers of CCEs included in a second control channel candidate with the maximum aggregation level are {16, 17, 18, 19, 20, 21, 22, 23}, a number of the start CCE of the search space corresponding to the maximum aggregation level is 8, that is, l=8.

If the aggregation level L of the first search space is equal to 1, $M^{(L)}$=6, K=0, and β=3, it can be learned that $$\left\lfloor \frac{L_{MAX} \cdot M^{(L_{MAX})}}{L} \right\rfloor = 16,$$

and a correspondence between a control channel candidate m in the first search space and a number of a CCE is shown in the following Table 11:

TABLE 11

| (m + 1)$^{th}$ control channel candidate | Number of a CCE included in a control channel candidate m |
|---|---|
| m = 0 | 8 |
| m = 1 | 10 |
| m = 2 | 11 |
| m = 3 | 14 |
| m = 4 | 17 |
| m = 5 | 20 |
| m = 6 | 23 |

When the foregoing manner is applied to a case in which numbers of CCEs included in the second search space are continuous, the foregoing manner is easy to implement, and can help reduce complexity of channel estimation and a blocking probability.

In this implementation, CCEs included in the first search space and CCEs included in the second search space can be discretely and unevenly distributed; in addition, a quantity of control channel candidates that are in the first search space and that are included in each control channel candidate with the maximum aggregation level may be configured, and different initialized values $K_l$ are used for each nested control channel candidate that has the maximum aggregation level, so that a blocking probability can be further reduced.

K and $K_l$ may be preset values, or may be determined by using the foregoing recursive function. Herein, the foregoing recursive function is expressed as a formula:

$$C(j)=(A \cdot C(j-1)) \mod D \quad (15).$$

In the formula, A is an integer, and may be a fixed value, or certainly may be a variable value.

When A in formula (12) is used to determine K, A may be denoted as $A_K$.

If the value is a variable value, the value of A may be determined based on a control resource set. For example, the value of A is related to an index of the configured control resource set. If a control resource set 0 and a control resource set 1 are configured, and the control resource set 0 and the control resource set 1 are respectively corresponding to a control resource set index 0 and a control resource set index 1, for the control resource set index 0, a value of A is 39820;

and for the control resource set index 1, a value of A is 39810. Indexes of different control resource sets are different. In this way, locations of a search space of a same terminal device in different control resource sets are different, thereby reducing a probability that search spaces of a terminal device and search spaces of another terminal device overlap in two different control resource sets.

Alternatively, the value of A may be configured, and values of A that are corresponding to different control resource set indexes may be configured by using higher layer signaling. When configured values of A that are corresponding to different control resource sets are the same, locations of CCEs of search spaces included in the different control resource sets are the same. In this way, the terminal device does not need to recalculate locations of the search spaces in different control resource sets, thereby helping the terminal device simultaneously perform joint detection on control channel candidates in two control resource sets or combine detection signals of control channel candidates in different control resource sets.

Alternatively, the value of A may be related to an aggregation level corresponding to the search space. The value of A may be determined based on the aggregation level and a correspondence between the aggregation level and A. For example, there are a plurality of predefined values of a characteristic parameter, and a value set is shown in Table 12:

TABLE 12

| Aggregation level | A |
| --- | --- |
| L = 8 | 39827 |
| L = 4 | 39825 |
| L = 2 | 39823 |
| L = 1 | 39821 |

Table 12 provides a relationship between the aggregation level and a preset value. If an aggregation level of the first search space is 2, a value of A is as follows: A=39823.

In this way, randomization parameters of search spaces corresponding to different aggregation levels are different, so that the search spaces corresponding to different aggregation levels do not completely overlap with each other, thereby reducing a blocking probability.

In addition, $K_l$ may be further related to an $(m'+1)^{th}$ control channel candidate. For example, A=B+m'; or A=B−m'. An obtaining manner of a value of B may be the same as that of the value of A described above. To be specific, in this case, A in formula (15) is equal to the foregoing fixed or variable value, namely, A plus m' or A minus m'. In this way, randomization parameters of the first search space distributed in CCEs included in control channel candidates in different second search spaces are different, and therefore, distribution locations of the first search space in the CCEs included in the control channel candidates in the different second search spaces are different, thereby reducing a blocking probability for the CCEs included in a control channel candidate in each second search space.

Values of K and $K_l$ may be different from the value of Y. In other words, a randomization parameter of a low aggregation level is different from a randomization parameter of a maximum aggregation level. In this way, even if CCEs of different terminal devices completely overlap with each other in the search space corresponding to the maximum aggregation level, CCEs of different terminal devices do not completely overlap with each other in the search space corresponding to the low aggregation level, thereby reducing a blocking probability.

It should be noted that, in this embodiment of the present disclosure, $L_{MAX} \cdot M^{(L_{MAX})}$ in the foregoing formula may be expressed as $N_{CCE,MAX}$, namely, a quantity of CCEs included in the second search space corresponding to the maximum aggregation level.

Based on the search space designed in the foregoing embodiment, the search space corresponding to the low aggregation level can be completely nested in the search space corresponding to the maximum aggregation level. In other words, the CCEs of the first search space are a subset of CCEs of the second search space. In this way, because a large quantity of CCEs included in different search spaces overlap with each other, during blind detection performed a plurality of times, multiplexing of channel estimation and/or demodulation of a received signal can be implemented, thereby reducing a quantity of times for repeatedly performing channel estimation and reducing demodulation complexity of a signal.

With reference to the foregoing embodiment, the following further describes how to apply the foregoing first search space and/or the foregoing second search space to this embodiment of the present disclosure.

Figure 16:
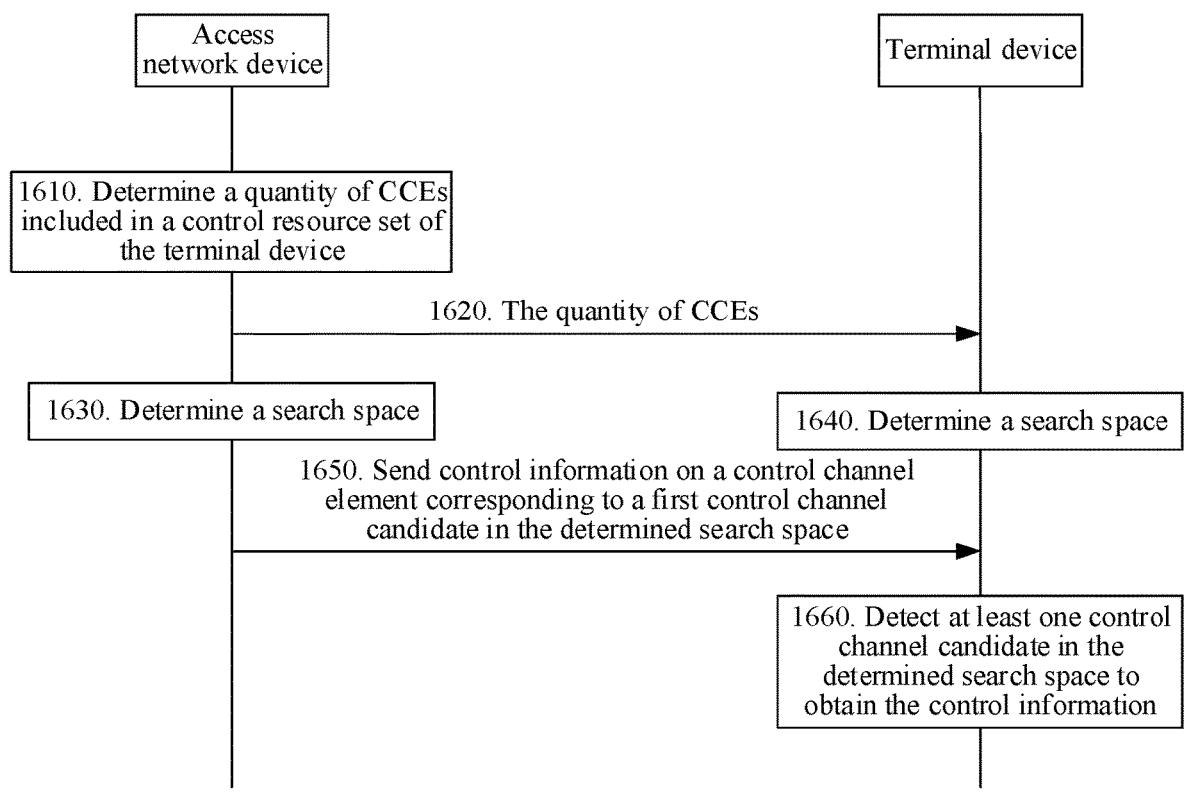
FIG. 16 is a schematic signaling diagram of a method according to an embodiment of the present disclosure.

This embodiment provides a method for determining a search space. FIG. 16 is a schematic signaling diagram of a method according to an embodiment of the present disclosure. It should be noted that some blocks in FIG. 16 and in the following content are optional, and there is no limitation that all blocks need to be included in this embodiment of the present disclosure. In addition, sequence numbers of blocks are merely used for description and do not represent a sequence. In addition, without particular description, a search space in this embodiment of the present disclosure may be the first search space described above, or may be the second search space described above, or may be the first search space and the second search space described above.

Block 1610: An access network device determines a quantity $N_{CCE}$ of control channel elements (CCE) included in a control resource set of a terminal device.

Alternatively, in block 1610, an access network device may determine configuration information of the terminal device, where the configuration information may include a quantity $N_{CCE}$ of CCEs.

The control channel resource set may be a set including a control channel resource, and a resource in the set can be used to send control information. Further, the control channel resource set includes one or more search spaces, and the control information is sent in the one or more search spaces. The terminal device performs blind detection in the one or more search spaces to obtain the control information. The blind detection may be a case in which the terminal device does not know a specific control channel specifically used to send the control information. Therefore, detection should be performed on a control channel candidate included in a search space until a control channel that carries the control information is detected.

Optionally, the access network device may configure one or more control resource sets for the terminal device. In this embodiment of the present disclosure, a specific control resource set is described, but there is no limitation that the access network device can configure only one control resource set for one terminal device. For each control channel resource set, both the terminal device and the access network device may determine the search space in the control channel resource set based on the method provided in this embodiment of the present disclosure. In this case, that the configuration information is determined in this block may be that the access network device determines the configuration information, or configures the configuration information. Further, the access network device may determine the configuration information or configure the configuration information based on a factor such as a channel environment. For example, the access network device configures the configuration information based on channel quality information reported by the terminal device and the like. This is not limited in this embodiment of the present disclosure.

Optionally, the control resource set may be predefined. The access network device and the terminal device may separately determine the control resource set based on a preset configuration.

Further, the control resource set is corresponding to at least two aggregation levels, and a maximum value of the at least two aggregation levels is the maximum aggregation level. For example, the control resource set is corresponding to a first aggregation level and a second aggregation level, and the second aggregation level is the maximum aggregation level.

Optionally, the configuration information may further include a configuration parameter of the search space. The configuration parameter of the search space may include at least two aggregation levels corresponding to the control resource set of the terminal device and/or a quantity of control channel candidates corresponding to each of the at least two aggregation levels.

It should be noted that the configuration parameter of the search space may be related to the control resource set. For example, the configuration parameter of the search space is configured only for the control resource set, and is a configuration parameter of the search space that is specific to the control resource set. Alternatively, the configuration parameter of the search space may be unrelated to the control resource set. For example, a plurality of control resource sets of a terminal device use a same configuration parameter of a search space. In other words, the configuration parameter of the search space is not configured for a specific control resource set, and the plurality of control resource sets share the same configuration parameter of the search space. Alternatively, the configuration parameter of the search space may be partially related to the control resource set, and partially unrelated to the control resource set. For example, a configuration parameter of a common search space may be unrelated to the control resource set, and a configuration parameter of a terminal device-specific search space may be related to the control resource set.

Optionally, both the configuration parameter of the common search space and the configuration parameter of the terminal device-specific search space may be unrelated to the control resource set, and the configuration parameter of the common search space and the configuration parameter of the terminal device-specific search space may be different.

In addition, the search space corresponding to the control channel resource of the terminal device in this embodiment of the present disclosure may be a search space in the control channel resource of the terminal device. The search space corresponding to the control channel resource has no relationship with an association between the control resource set and the configuration of the search space.

It should be noted that a same control resource set may be configured for different terminal devices. In addition, the control resource set configured for the different terminal devices may be corresponding to at least two different aggregation levels. For example, a same control resource set is configured for a terminal device 1 and a terminal device 2, aggregation levels corresponding to the control resource set configured for the terminal device 1 are 1, 2, and 4, and aggregation levels corresponding to the control resource set configured for the terminal device 2 are 2, 4, and 8. Therefore, for the access network device, there is one control resource set, and aggregation levels that can be corresponding to the control resource set are 1, 2, 4, and 8. Therefore, when determining the configuration information, the access network device determines configuration information of the terminal device. For example, the access network device determines that the aggregation levels corresponding to the control resource set of the terminal device 1 are 1, 2, and 4 and the aggregation levels corresponding to the control resource set of the terminal device 2 are 2, 4, and 8. It may be learned that control resource sets are different for different terminal devices. Therefore, the control resource set of the terminal device in this embodiment of the present disclosure may indicate that for the terminal device, configuration parameters corresponding to the control resource set may be different, and this does not indicate that the control resource set is dedicated to the terminal device.

An operation in this block may be implemented by the processor 201 in the foregoing access network device 102.

Block 1620: The access network device sends the quantity $N_{CCE}$ of CCEs by using signaling, and the terminal device receives the signaling that carries the quantity $N_{CCE}$ of CCEs.

Alternatively, the access network device sends the foregoing configuration information by using signaling, and the terminal device receives the signaling that carries the foregoing configuration information.

The signaling herein may be one or more signaling messages. Therefore, when the configuration information includes a plurality types of information, the plurality types of information may be separately sent to the terminal device by using different signaling messages. For example, one part of the configuration information is sent by using one or more types of signaling, and the other part of the configuration information is sent by using one or more other types of signaling.

Signaling in this embodiment may be higher layer signaling.

For example, the higher layer signaling may be one or more of the following messages: a master information block (MIB) message, system information, and a radio resource control (RRC) message. Further, the system information may be a system information block (SIB) message, or a system information block message used to configure a random access channel (RACH) resource. The RRC message may be a common RRC message, namely, an RRC message sent to a terminal device in a cell, or may be an RRC message specific to a terminal device, namely, an RRC message sent to a specific terminal device.

Optionally, the access network device may send, in different manners, configuration information corresponding to different search space types.

For example, if the search space is a common search space, the foregoing quantity of CCEs included in the control resource set of the terminal device may be sent by using an MIB message or a SIB message. If the search space is a terminal device-specific search space, the foregoing quantity of CCEs included in the control resource set of the terminal device may be sent by using an RRC message. Optionally, the RRC message may be an RRC message specific to the terminal device. Certainly, this is merely an example, and this embodiment is not limited to these messages. The configuration information sent by using the MIB message is mainly used to configure a control resource set in which control information for scheduling remaining minimum system information (RMSI) is located, to help the terminal device obtain most fundamental system information, such as an RACH resource. For the configuration information sent by using the SIB message used to configure the RACH resource, there is no need to consider a limitation of signaling overheads, so that configuration is more flexible. In addition, for the configuration information sent by using RRC signaling, there is also no need to consider a limitation of signaling overheads, the configuration information may be configured for a specific terminal device, and different control resource sets are configured for terminal devices with different requirements, thereby helping improve utilization of resources.

For another example, if the search space is a common search space, at least two aggregation levels and/or a quantity of control channel candidates corresponding to each of the at least two aggregation levels in the foregoing configuration information may be sent by using the foregoing system information, for example, may be sent by using the foregoing system information block message used to configure the RACH resource. If the search space is the terminal device-specific search space, at least two aggregation levels and/or a quantity of control channel candidates corresponding to each of the at least two aggregation levels in the foregoing configuration information may be sent by using an RRC message.

Optionally, a configuration parameter of the control resource set and a configuration parameter of the search space may be sent by using a same message.

Further, if the configuration parameter of the search space is related to the control resource set, and the configuration parameter of the control resource set and the configuration parameter of the search space are sent by using different messages, the message used to send the configuration parameter of the search space may further indicate a specific control resource set corresponding to the configuration parameter of the search space.

It should be noted that this block is optional. For example, the configuration parameter of the control resource set and the configuration parameter of the search space may be preset in the terminal device and the access network device, and do not need to be configured by the access network device for the terminal device.

In addition, a sequence of block 1620 and block 1610 is not limited, and block 1620 may be performed before block 1610. For example, the access network device may first send the configuration information to the terminal device. When the access network device should send control information to the terminal device, the access network device first determines the configuration information, and then performs blocks such as a block of determining the search space.

Further, signaling used to send the configuration parameter of the search space may further include at least one of the foregoing parameter $\alpha$ and the foregoing parameter $\beta$, and which parameter is to be sent depends on a corresponding search space. For example, if the foregoing first search space is applied, the signaling used to send the configuration parameter of the search space includes the foregoing parameter $\alpha$. If the foregoing second search space is applied, the signaling used to send the configuration parameter of the search space includes the foregoing parameter $\beta$. If the foregoing first search space and the foregoing second search space are applied, the signaling used to send the configuration parameter of the search space includes the foregoing parameter $\alpha$ and the foregoing parameter $\beta$. Certainly, the parameter $\alpha$ and/or the parameter $\beta$ may be alternatively sent by using signaling used to send the configuration parameter of the control resource set, or may be sent by using signaling independent of signaling used to send the configuration parameter of the search space and signaling used to send the configuration parameter of the control resource set.

A sending action in this block may be implemented by the transceiver 202 of the foregoing access network device 102. Certainly, the sending action in this block may be alternatively implemented by the transceiver 202 under control of the processor 201 of the foregoing access network device 102.

A receiving action in this block may be implemented by the transceiver 301 of the foregoing terminal device 104. Certainly, the receiving action in this block may be alternatively implemented by the transceiver 301 under control of the modem processor 304 of the foregoing terminal device 104.

Block 1630: The access network device determines a search space.

In an optional implementation, that the access network device determines the search space may be that the access network device determines, based on the quantity $N_{CCE}$ of CCEs and the maximum aggregation level of the at least two aggregation levels, the first search space corresponding to the first aggregation level. In this optional implementation, as described above, numbers of CCEs included in $M^{(L)}$ control channel candidates included in the determined first search space may meet formula (6) or formula (12).

Further, in this implementation, that the first search space corresponding to the first aggregation level is determined based on the quantity $N_{CCE}$ of CCEs and the maximum aggregation level of the at least two aggregation levels may include: calculating, based on the quantity $N_{CCE}$ of CCEs, the maximum aggregation level of the at least two aggregation levels, and formula (6) or formula (12), a number of at least one CCE included in the first search space, to obtain the first search space.

Calculation herein may indicate that the number of the start CCE of the first search space is calculated based on these parameters and formulas and then all CCEs of the first control channel candidate in the first search space are obtained based on the first aggregation level, for example, L continuous CCEs. Further, CCEs included in other control channel candidates in the first search space are obtained in sequence based on a quantity of control channel candidates included in the first search space and an interval between two adjacent control channel candidates. Therefore, the calculation in this embodiment of the present disclosure does not mean that each CCE should be determined in a calculation manner. Certainly, in this embodiment of the present disclosure, a case in which a number of each CCE is calculated by using the foregoing formula is not excluded.

It should be noted that all blocks of determining the search space in this embodiment of the present disclosure may be implemented in the foregoing manner. Same description is not repeated below.

In another optional implementation, that the access network device determines the search space may be that the access network device determines, based on the quantity $N_{CCE}$ of CCEs and a quantity of CCEs included in a search space corresponding to the maximum aggregation level of the at least two aggregation levels, the first search space corresponding to the first aggregation level. In this optional implementation, as described above, numbers of CCEs included in $M^{(L)}$ control channel candidates included in the determined first search space may meet formula (8), formula (10), or formula (11).

In still another optional implementation, that the access network device determines the search space may be that the access network device determines the second search space based on the parameter α. In this optional implementation, as described above, numbers of CCEs included in $M^{(L)}$ control channel candidates included in the determined second search space may meet formula (4).

In still another optional implementation, that the access network device determines the search space may be that the access network device determines the second search space based on the parameter α, and the access network device determines, based on the quantity $N_{CCE}$ of CCEs and the maximum aggregation level of the at least two aggregation levels, the first search space corresponding to the first aggregation level.

In still another optional implementation, that the access network device determines the search space may be that the access network device determines the second search space based on the parameter α, and that the access network device determines the search space may be that the access network device determines, based on the quantity $N_{CCE}$ of CCEs and the quantity of CCEs included in the search space corresponding to the maximum aggregation level of the at least two aggregation levels, the first search space corresponding to the first aggregation level.

In the following two optional implementations, both the first search space and the second search space provided in this embodiment of the present disclosure are used.

It should be noted that when the search space is determined, the parameter α and the parameter β used in the formula may be obtained in a plurality of manners.

For example, the parameter α and/or the parameter β may be preset in the terminal device and the access network device.

Alternatively, as described above, the parameter α and/or the parameter β may be configured by the access network device and sent by the access network device to the terminal device.

Alternatively, a correspondence between the aggregation level and the parameter α and/or the parameter β is preset in the terminal device and the access network device. In this case, in this block, the terminal device and the access network device may determine the parameter α and/or the parameter β based on the aggregation level and the correspondence.

Alternatively, the access network device may configure the correspondence between the aggregation level and the parameter α and/or the parameter β for the terminal device. In this case, in this block, the terminal device and the access network device may determine the parameter α and/or the parameter β based on the aggregation level and the correspondence.

For example, the correspondence may be as follows: When $L_{MAX}$=4, α=3. Optionally, When $L_{MAX}$=2, α=7.

Alternatively, the parameter α and/or the parameter β may be determined based on a quantity of control channel elements included in the second search space or the maximum aggregation level included in the control resource set. For example, $$\beta = \frac{\gamma \cdot L_{MAX}}{L} + 1, \beta = \frac{\gamma \cdot L_{MAX}}{L} - 1, \beta = \frac{\gamma \cdot M_{MAX} L_{MAX}}{L} - 1, \text{ or}$$

$$\beta = \frac{\gamma \cdot M_{MAX} L_{MAX}}{L} + 1,$$

where γ is a predefined constant, for example γ=2, or γ=$2^n$ and n is an integer. In this way, a value of the parameter α and/or a value of the parameter β are/is obtained without a need of additional system information, thereby saving additional signaling overheads.

The action in this block may be implemented by the processor 201 in the foregoing access network device 102.

Block 1640: The terminal device determines a search space.

It should be noted that a manner in which the terminal device determines the search space is the same as a manner in which the access network device determines the search space. Details are not described herein.

In addition, there is no sequence between block 1640 and block 1630. Block 1640 and block 1630 may be performed at the same time. Alternatively, block 1640 may be performed before block 1630, or the like. This is not limited in this embodiment of the present disclosure.

The action in this block may be implemented by the modem processor 304 of the foregoing terminal device 104.

Block 1650: The access network device sends control information on a control channel element corresponding to a first control channel candidate in the determined search space, where a quantity of control channel elements corresponding to the first control channel candidate is equal to the first aggregation level.

Certainly, in this block, the access network device may send the control information on a plurality of control channel candidates in the search space. This is not limited in this embodiment of the present disclosure.

A sending action in this block may be implemented by the transceiver 202 of the foregoing access network device 102. Certainly, the sending action in this block may be alternatively implemented by the transceiver 202 under control of the processor 201 of the foregoing access network device 102.

Block 1660: The terminal device detects at least one control channel candidate in the determined search space to obtain the control information.

It should be noted that the terminal device detects the control channel candidate in the search space in a blind detection manner. For a specific detection manner, refer to the prior art.

In addition, in block 1650 and block 1660, the determined search spaces may be the search spaces determined in block 1640 and block 1630. For example, when the search spaces determined in block 1640 and block 1630 are the first search space, the search spaces in block 1650 and block 1660 are the first search space. When the search spaces determined in block 1640 and block 1630 are the second search space, the search spaces in block 1650 and block 1660 are the second search space. When the search spaces determined in block 1640 and block 1630 are the first search space and the second search space, the search spaces in block 1650 and block 1660 are the first search space and the second search space.

The action in this block may be implemented by the transceiver 301 of the foregoing terminal device 104. Certainly, the action in this block may be alternatively jointly implemented by the modem processor 304 and the transceiver 301 of the foregoing terminal device 104.

In the search space determined in the foregoing method, a search space corresponding to a low aggregation level can be nested in a search space corresponding to the maximum aggregation level. In other words, CCEs included in the search space corresponding to the low aggregation level are a subset of CCEs included in the search space corresponding to the maximum aggregation level, thereby reducing complexity of channel estimation. In addition, control channel candidates in the search space corresponding to the low aggregation level may be discretely and unevenly distributed in the CCEs included in the search space corresponding to the maximum aggregation level. Because of such discrete and uneven distribution, a quantity of same CCEs included in search spaces of different terminal devices is further reduced, thereby reducing a blocking probability.

An embodiment of the present disclosure further provides an apparatus (for example, an integrated circuit, a wireless device, or a circuit module) configured to implement the foregoing method. The apparatus implementing the method described in this specification may be an independent device, or may be a part of a relatively large device. The device may be (i) an independent IC; (ii) a set that has one or more ICs and that can include a memory IC configured to store data and/or an instruction; (iii) an RFIC, for example, an RF receiver or an RF transmitter/receiver; (iv) an ASIC, for example, a mobile station modem; (v) a module that can be built into another device; (vi) a receiver, a cellular phone, a wireless device, a handheld machine, or a mobile unit; or (vii) the like.

The method and apparatus that are provided in the embodiments of the present disclosure may be applied to the terminal device or the access network device (the terminal device and the access network device may be collectively referred to as a wireless device). The terminal device, the access network device, or the wireless device may include a hardware layer, an operating system layer that runs on the hardware layer, and an application layer that runs on the operating system layer. The hardware layer includes hardware such as a central processing unit (central processing unit, CPU), a memory management unit (memory management unit, MMU), and a memory (also referred to as a main memory). An operating system may be any one or more computer operating systems that implement service processing by using a process (process), such as a Linux operating system, a Unix operating system, an Android operating system, an iOS operating system, or a Windows operating system. The application layer includes applications such as a browser, an address book, word processing software, and instant messaging software. In addition, a specific structure of an entity for performing the method is not limited in the embodiments of the present disclosure, provided that the entity can perform communication based on the search space determining method in the embodiments of the present disclosure by running a program of code recording the method in the embodiments of the present disclosure. For example, the search space determining method in the embodiments of the present disclosure may be performed by the terminal device, the access network device, or a function module that is in the terminal device or the access network device and that can invoke a program and execute the program.

A person of ordinary skill in the art may be aware that, in combination with the examples described in the embodiments disclosed in this specification, units and algorithm blocks may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

In addition, aspects or features in the embodiments of the present disclosure may be implemented as a method, an apparatus or a product that uses standard programming and/or engineering technologies. The term "product" used in this disclosure covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedure or functions according to the embodiments of the present disclosure are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible to a computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a solid state disk (Solid State Disk, SSD)), or the like.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this disclosure, it should be understood that the disclosed system, apparatus, and methods may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of the embodiments of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the blocks of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A method, comprising:
    determining a quantity $N_{CCE}$ of control channel elements (CCEs) comprised in a control resource set of a terminal device, wherein $N_{CCE}$ is a positive integer, the control resource set corresponds to at least two aggregation levels, the at least two aggregation levels comprise a maximum aggregation level and a first aggregation level, the first aggregation level is less than the maximum aggregation level, and the maximum aggregation level is a highest aggregation level in the at least two aggregation levels; and
    determining, based on the quantity $N_{CCE}$ of CCEs and the maximum aggregation level, a first search space corresponding to the first aggregation level; or
    determining, based on the quantity $N_{CCE}$ of CCEs and a quantity of CCEs comprised in a search space corresponding to the maximum aggregation level, a first search space corresponding to the first aggregation level.

2. The method of claim 1, wherein $\alpha$ is a positive integer greater than 1.

3. The method of claim 1, wherein the determining first search space that corresponds to the first aggregation level and that is in the control resource set comprises:

determining the first search space based on configuration information, a parameter $\beta$, and the maximum aggregation level; or based on configuration information, a parameter $\beta$, and the quantity of CCEs comprised in the search space corresponding to the maximum aggregation level, wherein $\beta$ meets a relation that a maximum common divisor of $\beta$ and $$\left\lfloor \frac{L_{MAX} \cdot M^{(L_{MAX})}}{L} \right\rfloor$$

is 1 and $\beta$ is a positive integer greater than 1, wherein L is the first aggregation level, $L_{MAX}$ is the maximum aggregation level, and $L_{MAX} \cdot M^{(L_{MAX})}$ is the quantity of CCEs comprised in the search space corresponding to the maximum aggregation level $L_{MAX}$.

4. The method of claim 3, wherein the first search space comprises $M^{(L)}$ control channel candidates; and
    when the first search space that corresponds to the first aggregation level and that is in the control resource set is determined based on the configuration information and the maximum aggregation level, numbers of CCEs comprised in the $M^{(L)}$ control channel candidates meet formula (2):

$$L\{K + \beta \cdot m\} \bmod \left\lfloor \frac{L_{MAX}}{L} \right\rfloor + i + l_{m'}; \qquad (2)$$

or
    when the first search space that corresponds to the first aggregation level and that is in the control resource set is determined based on the configuration information and the quantity of CCEs comprised in the search space corresponding to the maximum aggregation level, numbers of CCEs comprised in the $M^{(L)}$ control channel candidates meet formula (3):

$$\left\{L\{K + \beta \cdot m\} \bmod \left\lfloor \frac{L_{MAX} \cdot M^{(L_{MAX})}}{L} \right\rfloor + l\right\} \bmod N_{CCE} + i, \qquad (3)$$

wherein
    $N_{CCE}$ is the quantity of control channel elements CCEs comprised in the control resource set, K is a parameter related to an identifier of the terminal device or a preset value, $M^{(L_{MAX})}$ is a quantity of control channel candidates comprised in the search space corresponding to the maximum aggregation level $L_{MAX}$, i=0,L, L−1, m=0, . . . , $M^{(L)}$−1, $M^{(L)}$ is a quantity of control channel candidates comprised in the first search space, and l or $l_{m'}$ is an integer.

5. The method of claim 3, wherein
    when the first search space that corresponds to the first aggregation level and that is in the control resource set is determined based on the configuration information and the maximum aggregation level, $M^{(L)}$ meets the following relationship:

$$\beta \cdot M^{(L)} \geq \left\lfloor \frac{L_{MAX}}{L} \right\rfloor;$$

or when the first search space that corresponds to the first aggregation level and that is in the control resource set is determined based on the configuration information and the quantity of CCEs comprised in the search space corresponding to the maximum aggregation level, $M^{(L)}$ meets the following relationship:

$$\beta \cdot M^{(L)} \geq \left\lfloor \frac{L_{MAX} \cdot M^{(L_{MAX})}}{L} \right\rfloor.$$

6. The method of claim 1, wherein the first search space comprises $M^{(L)}$ control channel candidates; and when the first search space that corresponds to the first aggregation level and that is in the control resource set is determined based on configuration information and the quantity of CCEs comprised in the search space corresponding to the maximum aggregation level, numbers of CCEs comprised in the $M^{(L)}$ control channel candidates meet formula (4):

$$L\left\{ K + \left\lfloor \frac{m \cdot L_{MAX} \cdot M^{(L_{MAX})}}{L \cdot M^{(L)}} \right\rfloor \right\} \bmod \left\lfloor \frac{L_{MAX}}{L} \right\rfloor + i + l_{m'}; \quad (4)$$

or when the first search space that corresponds to the first aggregation level and that is in the control resource set is determined based on the configuration information and the quantity of CCEs comprised in the search space corresponding to the maximum aggregation level, numbers of CCEs comprised in the $M^{(L)}$ control channel candidates meet formula (5):

$$\left\{ L\left\{ K + \left\lfloor \frac{m \cdot L_{MAX} \cdot M^{(L_{MAX})}}{L \cdot M^{(L)}} \right\rfloor \right\} \bmod \left\lfloor \frac{L_{MAX} \cdot M^{(L_{MAX})}}{L} \right\rfloor + l \right\} \quad (5)$$

$$\bmod N_{CCE} + i,$$

wherein $L_{MAX}$ is the maximum aggregation level, $N_{CCE}$ is the quantity of control channel elements CCEs comprised in the control resource set, L is the first aggregation level, L is an integer less than $L_{MAX}$, K is a parameter related to an identifier of the terminal device or a preset value, $M^{(L_{MAX})}$ is a quantity of control channel candidates comprised in the search space corresponding to the maximum aggregation level $L_{MAX}$, $L_{MAX} \cdot M^{(L_{MAX})}$ is the quantity of CCEs comprised in the search space corresponding to the maximum aggregation level $L_{MAX}$, i=0, . . . ,L–1, m=0, . . . ,$M^{(L)}$–1, $M^{(L)}$ is a quantity of control channel candidates comprised in the first search space, and l or $l_{m'}$ is an integer.

7. The method of claim 1, wherein the first search space comprises $M^{(L)}$ control channel candidates; and when the first search space that corresponds to the first aggregation level and that is in the control resource set is determined based on configuration information and the maximum aggregation level, numbers of CCEs comprised in the $M^{(L)}$ control channel candidates meet formula (6):

$$L\left\{ K_1 + \left\lfloor \frac{m \cdot L_{MAX}}{L \cdot M_{m'}^{(L)}} \right\rfloor \right\} \bmod \left\lfloor \frac{L_{MAX}}{L} \right\rfloor + i + l_{m'}, \quad (6)$$

wherein $L_{MAX}$ is the maximum aggregation level, L is the first aggregation level, m'=0, . . . ,$M^{(L_{MAX})}$–1, $K_1$ is a parameter related to an identifier of the terminal device or a preset value, $M^{(L_{MAX})}$ is a quantity of control channel candidates comprised in the search space corresponding to the maximum aggregation level $L_{MAX}$, i=0, . . . ,L–1, m=0,$M_{m'}^{(L)}$–1, $M_{m'}^{(L)}$ is a quantity of control channel candidates that are comprised in an $(m'+1)^{th}$ control channel candidate and that have an aggregation level of L, and $l_{m'}$ is an integer.

8. The method of claim 4, wherein l is a number of a start CCE of a start control channel candidate in the search space corresponding to the maximum aggregation level $L_{MAX}$, $l_{m'}$ is a number of a start CCE of the $(m'+1)^{th}$ control channel candidate in the search space corresponding to the maximum aggregation level $L_{MAX}$.

9. The method of claim 1, further comprising:

sending control information on a control channel element corresponding to one or more control channel candidates in the first search space.

10. The method of claim 1, further comprising:

detecting at least one control channel candidate in the first search space to obtain control information.

11. A wireless apparatus, comprising a processor and a memory coupled to the processor, wherein the processor is configured to determine a quantity $N_{CCE}$ of control channel elements CCEs comprised in a control resource set of a terminal device, wherein $N_{CCE}$ is a positive integer, the control resource set corresponds to at least two aggregation levels, the at least two aggregation levels comprise a maximum aggregation level and a first aggregation level, the first aggregation level is less than the maximum aggregation level, and the maximum aggregation level is a highest aggregation level in the at least two aggregation levels; and the processor is further configured to determine, based on the quantity $N_{CCE}$ of CCEs and the maximum aggregation level, a first search space corresponding to the first aggregation level; or the processor is further configured to determine, based on the quantity $N_{CCE}$ of CCEs and a quantity of CCEs comprised in a search space corresponding to the maximum aggregation level, a first search space corresponding to the first aggregation level.

12. The wireless apparatus of claim 11, further comprising a transceiver; and the transceiver is configured to send control information on a control channel element corresponding to a first control channel candidate in the first search space.

13. The wireless apparatus claim 11, further comprising a transceiver; and the transceiver is configured to detect at least one control channel candidate in the first search space to obtain control information.

14. The wireless apparatus claim 11, wherein α is a positive integer greater than 1.

15. The wireless apparatus claim 11, wherein the determining the first search space comprises:

determining the first search space based on configuration information, a parameter β, and the maximum aggregation level; or based on configuration information, a parameter β, and the quantity of CCEs comprised in the search space corresponding to the maximum aggregation level, wherein β meets a relation that a maximum common divisor of β and $$\left\lfloor \frac{L_{MAX} \cdot M^{(L_{MAX})}}{L} \right\rfloor$$

is 1 and β is a positive integer greater than 1, wherein L is the first aggregation level, $L_{MAX}$ is the maximum aggregation level, and $L_{MAX} \cdot M^{(L_{MAX})}$ is the quantity of CCEs comprised in the search space corresponding to the maximum aggregation level $L_{MAX}$.

16. The wireless apparatus claim 15, wherein the first search space comprises $M^{(L)}$ control channel candidates; and
when the first search space that corresponds to the first aggregation level and that is in the control resource set is determined based on the configuration information and the maximum aggregation level, numbers of CCEs comprised in the $M^{(L)}$ control channel candidates meet formula (2):

$$L\{K + \beta \cdot m\} \mathrm{mod} \left\lfloor \frac{L_{MAX}}{L} \right\rfloor + i + l_{m'}; \quad (2)$$

or
when the first search space that corresponds to the first aggregation level and that is in the control resource set is determined based on the configuration information and the quantity of CCEs comprised in the search space corresponding to the maximum aggregation level, numbers of CCEs comprised in the $M^{(L)}$ control channel candidates meet formula (3):

$$\left\{ L\{K + \beta \cdot m\} \mathrm{mod} \left\lfloor \frac{L_{MAX} \cdot M^{(L_{MAX})}}{L} \right\rfloor + l \right\} \mathrm{mod} N_{CCE} + i, \quad (3)$$

wherein
$N_{CCE}$ is the quantity of control channel elements CCEs comprised in the control resource set, K is a parameter related to an identifier of the terminal device or a preset value, $M^{(L_{MAX})}$ is a quantity of control channel candidates comprised in the search space corresponding to the maximum aggregation level $L_{MAX}$, i=0, . . . ,L−1, m=0,L, $M^{(L)}$−1, $M^{(L)}$ is a quantity of control channel candidates comprised in the first search space, and l or $l_{m'}$ is an integer.

17. The wireless apparatus claim 15, wherein
when the first search space that is corresponding to the first aggregation level and that is in the control resource set is determined based on the configuration information and the maximum aggregation level, $M^{(L)}$ meets the following relationship:

$$\beta \cdot M^{(L)} \geq \left\lfloor \frac{L_{MAX}}{L} \right\rfloor;$$

or
when the first search space that corresponds to the first aggregation level and that is in the control resource set is determined based on the configuration information and the quantity of CCEs comprised in the search space corresponding to the maximum aggregation level, $M^{(L)}$ meets the following relationship:

$$\beta \cdot M^{(L)} \geq \left\lfloor \frac{L_{MAX} \cdot M^{(L_{MAX})}}{L} \right\rfloor.$$

18. The wireless apparatus claim 15, wherein the first search space comprises $M^{(L)}$ control channel candidates; and
when the first search space that corresponds to the first aggregation level and that is in the control resource set is determined based on configuration information and the quantity of CCEs comprised in the search space corresponding to the maximum aggregation level, numbers of CCEs comprised in the $M^{(L)}$ control channel candidates meet formula (4):

$$L\left\{ K + \left\lfloor \frac{m \cdot L_{MAX} \cdot M^{(L_{MAX})}}{L \cdot M^{(L)}} \right\rfloor \right\} \mathrm{mod} \left\lfloor \frac{L_{MAX}}{L} \right\rfloor + i + l_{m'}; \quad (4)$$

or
when the first search space that corresponds to the first aggregation level and that is in the control resource set is determined based on the configuration information and the quantity of CCEs comprised in the search space corresponding to the maximum aggregation level, numbers of CCEs comprised in the $M^{(L)}$ control channel candidates meet formula (5):

$$\left\{ L\left\{ K + \left\lfloor \frac{m \cdot L_{MAX} \cdot M^{(L_{MAX})}}{L \cdot M^{(L)}} \right\rfloor \right\} \mathrm{mod} \left\lfloor \frac{L_{MAX} \cdot M^{(L_{MAX})}}{L} \right\rfloor + l \right\} \quad (5)$$

$$\mathrm{mod} N_{CCE} + i,$$

wherein
$L_{MAX}$ is the maximum aggregation level, $N_{CCE}$ is the quantity of control channel elements CCEs comprised in the control resource set, L is the first aggregation level, L is an integer less than $L_{MAX}$, K is a parameter related to an identifier of the terminal device or a preset value, $M^{(L_{MAX})}$ is a quantity of control channel candidates comprised in the search space corresponding to the maximum aggregation level $L_{MAX}$, $L_{MAX} \cdot M^{(L_{MAX})}$ is the quantity of CCEs comprised in the search space corresponding to the maximum aggregation level $L_{MAX}$, i=0, . . . ,L−1, m=0, . . . ,$M^{(L)}$−1, $M^{(L)}$ is a quantity of control channel candidates comprised in the first search space, and l or $l_{m'}$ is an integer.

19. The wireless apparatus claim 11, wherein the first search space comprises $M^{(L)}$ control channel candidates; and
when the first search space that corresponds to the first aggregation level and that is in the control resource set is determined based on configuration information and the maximum aggregation level, numbers of CCEs comprised in the $M^{(L)}$ control channel candidates meet formula (6):

$$L\left\{K_1 + \left\lfloor \frac{m \cdot L_{MAX}}{L \cdot M_{m'}^{(L)}} \right\rfloor \right\} \bmod \left\lfloor \frac{L_{MAX}}{L} \right\rfloor + i + l_{m'}, \quad (6)$$

wherein $L_{MAX}$ is the maximum aggregation level, L is the first aggregation level, m'=0, . . . ,$M^{(L_{MAX})}$−1, $K_I$ is a parameter related to an identifier of the terminal device or a preset value, $M^{(L_{MAX})}$ is a quantity of control channel candidates comprised in the search space corresponding to the maximum aggregation level $L_{MAX}$, i=0, . . . , L−1, m=0, . . . , $M_m^{(L)}$−1, $M_{m'}^{(L)}$ is a quantity of control channel candidates that are comprised in an (m'+1)$^{th}$ control channel candidate and that have an aggregation level of L, and $l_{m'}$ is an integer.

20. A non-transitory computer-readable storage medium comprising instructions which, when executed by a computer, cause the computer to carry out the following:

determining a quantity $N_{CCE}$ of control channel elements CCEs comprised in a control resource set of a terminal device, wherein $N_{CCE}$ is a positive integer, the control resource set corresponds to at least two aggregation levels, the at least two aggregation levels comprise a maximum aggregation level and a first aggregation level, the first aggregation level is less than the maximum aggregation level, and the maximum aggregation level is a highest aggregation level in the at least two aggregation levels; and determining, based on the quantity $N_{CCE}$ of CCEs and the maximum aggregation level, a first search space corresponding to the first aggregation level; or determining, based on the quantity $N_{CCE}$ of CCEs and a quantity of CCEs comprised in a search space corresponding to the maximum aggregation level, a first search space corresponding to the first aggregation level.

\* \* \* \* \*